(12) United States Patent
Heyrani-Nobari et al.

(10) Patent No.: US 11,556,568 B2
(45) Date of Patent: Jan. 17, 2023

(54) APPARATUSES, METHODS, AND COMPUTER PROGRAM PRODUCTS FOR DATA PERSPECTIVE GENERATION AND VISUALIZATION

(71) Applicant: Optum Services (Ireland) Limited, Dublin (IE)

(72) Inventors: Ghasem Heyrani-Nobari, Dublin (IE); Jose Antonio Sierra Padilla, Rathmines (ES)

(73) Assignee: Optum Services (Ireland) Limited, Dublin (IE)

( * ) Notice: Subject to any disclaimer, the term of this patent is extended or adjusted under 35 U.S.C. 154(b) by 119 days.

(21) Appl. No.: 16/776,151

(22) Filed: Jan. 29, 2020

(65) Prior Publication Data
US 2021/0232607 A1    Jul. 29, 2021

(51) Int. Cl.
*G06F 16/28* (2019.01)
*G06F 16/22* (2019.01)
*G06N 20/00* (2019.01)

(52) U.S. Cl.
CPC ........ *G06F 16/287* (2019.01); *G06F 16/2282* (2019.01); *G06F 16/289* (2019.01); *G06N 20/00* (2019.01)

(58) Field of Classification Search
CPC .............. G06F 16/287; G06F 16/289; G06F 16/2282; G06N 20/00
USPC ........................................................ 707/737
See application file for complete search history.

(56) References Cited

U.S. PATENT DOCUMENTS

| | | | |
|---|---|---|---|
| 7,788,070 B2 | 8/2010 | Grichnik et al. | |
| 9,404,833 B2 | 8/2016 | Stadlbauer et al. | |
| 2006/0218108 A1 | 9/2006 | Panfilov et al. | |
| 2013/0198119 A1* | 8/2013 | Eberhardt, III | G06N 20/00 706/12 |

(Continued)

FOREIGN PATENT DOCUMENTS

WO    2013/034171 A1    3/2013

OTHER PUBLICATIONS

Introduction to Architectural Design Optimization—Thomas Wortmann and Giacomo Nannicini ("Wortmann").

*Primary Examiner* — James Trujillo
*Assistant Examiner* — Antonio J Caiado
(74) *Attorney, Agent, or Firm* — Alston & Bird LLP

(57) ABSTRACT

Embodiments of the present disclosure provide apparatuses, methods, computer program products, and systems for data perspective generation and visualization. Some example embodiments provide advantages of exploring various ideas, represented by and/or associated with one or more perspective data objects, without utilizing a complex re-configuration stage for one or more machine learning models, and/or without utilizing one or more team members conventionally required to ensure proper implementation of the idea(s). Similar advantages are obtained when desiring to change an existing idea, change the level of granularity associated with the processing, and/or the like. Some embodiments are configured to cause rendering of interfaces associated with the processing, and/or enable a user to user interaction for inputting the desired level of granularity of the generated perspectives and/or desired granularity for the analysis of the data set. Some embodiments generate various graphical data objects to enable such processing.

20 Claims, 17 Drawing Sheets

(56) References Cited

U.S. PATENT DOCUMENTS

| | | |
|---|---|---|
| 2014/0365180 A1 | 12/2014 | Lam et al. |
| 2015/0120271 A1 | 4/2015 | Milstead et al. |
| 2015/0127650 A1* | 5/2015 | Carlsson ................ G06F 16/93 |
| | | 707/737 |
| 2016/0034561 A1* | 2/2016 | Sexton ................ G06F 16/9024 |
| | | 707/737 |
| 2016/0140304 A1 | 5/2016 | Myers et al. |
| 2016/0246871 A1* | 8/2016 | Singh ..................... G16B 40/00 |
| 2017/0063886 A1* | 3/2017 | Muddu ................ G06K 9/2063 |
| 2018/0212985 A1* | 7/2018 | Zadeh ................ H04L 63/1425 |
| 2019/0228419 A1* | 7/2019 | Sampath ................ G06Q 99/00 |
| 2019/0243836 A1 | 8/2019 | Nanda et al. |
| 2019/0303799 A1* | 10/2019 | Gottin ..................... G06N 20/00 |
| 2020/0007934 A1* | 1/2020 | Ortiz ................ H04N 21/25883 |
| 2020/0097810 A1* | 3/2020 | Hetherington ....... G06N 3/0454 |
| 2020/0285997 A1* | 9/2020 | Bhattacharyya ......... G06N 7/00 |
| 2020/0334569 A1* | 10/2020 | Moghadam .......... G06N 3/0481 |
| 2022/0044133 A1* | 2/2022 | Otto ..................... G06K 9/6267 |
| 2022/0050820 A1* | 2/2022 | Matyska ................ G06Q 40/08 |

* cited by examiner

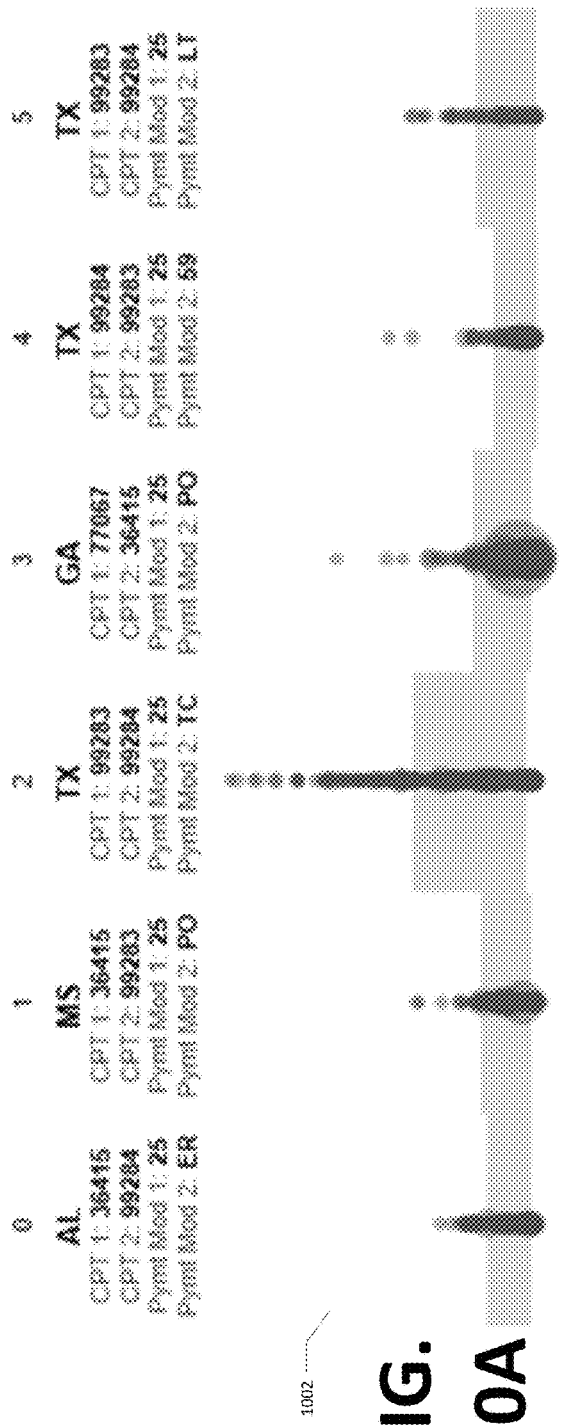
FIG. 10A
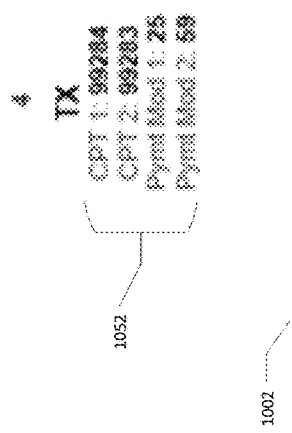 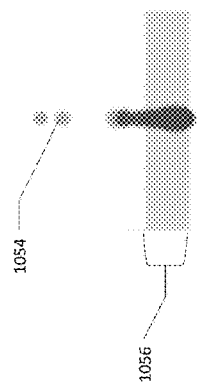
FIG. 10B

APPARATUSES, METHODS, AND COMPUTER PROGRAM PRODUCTS FOR DATA PERSPECTIVE GENERATION AND VISUALIZATION

TECHNOLOGICAL FIELD

Embodiments of the present disclosure generally relate to processing data sets of various sizes in an efficient and effective manner, and specifically to generating and visualizing data perspectives associated with some or all of a data set.

BACKGROUND

Traditionally, data processing to explore various ideas associated with a data set is a complex, resource-intensive, and time-consuming task. One or more engineers are utilized to annually fix and/or clean a data set, and design, implement, and/or analyze exploratory ideas via one or more computing systems. The complexity of such a process makes it hard to explain, and/or justify, the reasons behind the ideas for analyzing the data set as well as the models for implementing such ideas. Similarly, the complexity and resource-intensive nature of such analysis makes it difficult to enable users, such as customers, to change the focus of the ideas or generate new ideas, since such changes would require re-design and/or re-training of the analysis models associated with the idea(s). Such problems increase in instances where significantly large data sets are to be analyzed, often referred to in the context of "big data," and/or when analyzing data sets in accordance with various ideas of varying levels of granularity. In this regard, implementation of such data analysis ideas and subsequent changes often involve consultation by a full stack developer, data engineer, and/or data visualization expert to perform various tasks, adding to the complexity and resource-intensive nature of such processes. Applicant has discovered problems with current implementations of processing data sets in accordance with one or more ideas for analyzing the data set. Through applied effort, ingenuity, and innovation, Applicant has solved many of these identified problems by developing embodied in the present disclosure, which are described in detail below.

BRIEF SUMMARY

In general, embodiments of the present disclosure provided herein for data perspective generation and visualization. Other implementations for one or more of the alternative illuminator assemblies and/or alternative illumination imaging apparatuses will be, or will become, apparent to one with skill in the art upon examination of the following figures and detailed description. It is intended that all such additional implementations be included within this description be within the scope of the disclosure, and be protected by the following claims.

In accordance with at least one aspect of the present disclosure, an apparatus for data perspective generation and visualization is provided. In at least one example embodiment, the apparatus includes at least one processor and at least one memory. The at least one memory includes computer-coded instructions stored thereon. The computer-coded instructions, in execution with the act least one processor, configure the apparatus to identify a processable data set comprising at least one data record. The example apparatus is further configured to generate a perspectives set based at least in part on at least a data feature set associated with the processable data set, the perspectives set comprising at least one perspective data object comprising at least a subset of the data feature set. The example apparatus is further configured to generate, based at least in part on at least the perspectives set, a hierarchical perspectives data object representing a set of perspective detail levels, each perspective detail level of the set of perspective detail levels associated with at least one perspective data object of the perspectives set. The example apparatus is further configured to receive a selected perspectives level indication representing a selected perspective detail level of the set of perspective detail levels, where the selected perspective detail level is associated with a selected perspective subset of the perspectives set. The example apparatus is further configured to generate, using an anomaly detection model set, an anomaly score set for at least one perspective data object of the selected perspective subset.

Additionally or alternatively, in at least some embodiments of the example apparatus, to generate the perspective set based at least in part on at least the claim feature set, the apparatus is configured to generate the perspective set utilizing a data perspectives generation model, the data perspectives generation model configured to receive the processable data set as input, where the data perspectives generation model comprises a self-supervised machine learning model.

Additionally or alternatively, in at least some embodiments of the example apparatus, to generate the perspective set based at least in part on at least the claim feature set, the apparatus is configured to generate the claim feature set based at least in part on at least the processable data set; and identify at least one subset of the claim feature set, the subset of the data feature set sharing a prominent characteristic.

Additionally or alternatively, in at least some embodiments of the example apparatus, to identify the processable data set, the apparatus is configured to retrieve the processable data set from at least one datastore.

Additionally or alternatively, in at least some embodiments of the example apparatus, to identify the processable data set, the apparatus is configured to receive the processable data set from a client device.

Additionally or alternatively, in at least some embodiments of the example apparatus, the apparatus is further configured to cause rendering of a perspectives analysis interface, the perspectives analysis interface comprising at least one interface element, the at least one interface element associated with (1) one or more of the anomaly score set for each perspective data object of the selected perspective subset, (2) the hierarchical perspectives data object, and (3) the processable data set.

Additionally or alternatively, in at least some embodiments of the example apparatus, the set of perspective detail levels represents, for at least a first perspective data object of the perspectives set and a second perspective data object of the perspectives set, a parent-child relationship between the first perspective data object and the second perspective data object.

Additionally or alternatively, in at least some embodiments of the example apparatus, to generate, based at least in part on at least the perspectives set, the hierarchical perspectives data object, the apparatus is configured to generate a perspective relations graph data object based at least in part on the perspectives set, where the perspective relations graph data object represents a set of weighted relationships between perspective data objects of the perspectives set; and generate the hierarchical perspectives data object based at least in part on at least the perspective relations graph data object.

Additionally or alternatively, in at least some embodiments of the example apparatus, to receive the selected perspectives level indication, the apparatus is configured to cause rendering of the hierarchical perspectives data object; and receive the selected perspectives level indication in response to user interaction with the hierarchical perspectives data object.

Additionally or alternatively, in at least some embodiments of the example apparatus, the apparatus is further configured to receive a depth level selection, where the perspective set comprises a number of perspective data objects based at least in part on the depth level selection. Additionally or alternatively, in at least some such embodiments of the example apparatus, the apparatus is further configured to cause rendering of a depth selection interface element, where the depth level selection is received in response to user interaction with the depth selection interface element, and where the depth selection interface element comprises a slider interface element. Additionally or alternatively, in at least some such embodiments of the example apparatus, the apparatus is further configured to generate a recommended optimal depth level based at least in part on the data feature set, where the depth selection interface element includes an indication of the recommended optimal depth level.

In accordance with yet another aspect of the present disclosure, a computer-implemented method for data perspective generation and visualization is provided. The computer-implemented method includes one or more steps, which may be implemented and/or performed using various computing hardware and/or software implementations described herein. In at least one example embodiment of the computer-implemented method, the computer-implemented comprises identifying a processable data set comprising at least one data record. The example computer-implemented method further comprises generating a perspectives set based at least in part on at least a data feature set associated with the processable data set, the perspectives set comprising at least one perspective data object comprising at least a subset of the data feature set. The example computer-implemented method further comprises generating, based at least in part on at least the perspectives set, a hierarchical perspectives data object representing a set of perspective detail levels, each perspective detail level of the set of perspective detail levels associated with at least one perspective data object of the perspectives set. The example computer-implemented method further comprises receiving a selected perspectives level indication representing a selected perspective detail level of the set of perspective detail levels, where the selected perspective detail level is associated with a selected perspective subset of the perspectives set. The example computer-implemented method further comprises generating, using an anomaly detection model set, an anomaly score set for at least one perspective data object of the selected perspective subset.

Additionally or alternatively, in at least some embodiments of the example computer-implemented method, generating the perspective set based at least in part on at least the claim feature set comprises generating the perspective set utilizing a data perspectives generation model, the data perspectives generation model configured to receive the processable data set as input, where the data perspectives generation model comprises a self-supervised machine learning model.

Additionally or alternatively, in at least some embodiments of the example computer-implemented method, generating the perspective set based at least in part on at least the claim feature set comprises generating the claim feature set based at least in part on at least the processable data set; and identifying at least one subset of the claim feature set, the subset of the data feature set sharing a prominent characteristic.

Additionally or alternatively, in at least some embodiments of the example computer-implemented method, identifying the processable data set comprises retrieving the processable data set from at least one datastore.

Additionally or alternatively, in at least some embodiments of the example computer-implemented method, identifying the processable data set comprises receiving the processable data set from a client device.

Additionally or alternatively, in at least some embodiments of the example computer-implemented method, the computer-implemented method further comprises causing rendering of a perspectives analysis interface, the perspectives analysis interface comprising at least one interface element, the at least one interface element associated with (1) one or more of the anomaly score set for each perspective data object of the selected perspective subset, (2) the hierarchical perspectives data object, and (3) the processable data set.

Additionally or alternatively, in at least some embodiments of the example computer-implemented method, the set of perspective detail levels represents, for at least a first perspective data object of the perspectives set and a second perspective data object of the perspectives set, a parent-child relationship between the first perspective data object and the second perspective data object.

Additionally or alternatively, in at least some embodiments of the example computer-implemented method, generating, based at least in part on at least the perspectives set, the hierarchical perspectives data object comprises generating a perspective relations graph data object based at least in part on the perspectives set, where the perspective relations graph data object represents a set of weighted relationships between perspective data objects of the perspectives set; and generating the hierarchical perspectives data object based at least in part on at least the perspective relations graph data object.

Additionally or alternatively, in at least some embodiments of the example computer-implemented method, receiving the selected perspectives level indication comprises causing rendering of the hierarchical perspectives data object; and receiving the selected perspectives level indication in response to user interaction with the hierarchical perspectives data object.

Additionally or alternatively, in at least some embodiments of the example computer-implemented method, the computer-implemented method further comprises receiving a depth level selection, where the perspective set comprises a number of perspective data objects based at least in part on the depth level selection. Additionally or alternatively, in at least some such embodiments of the example computer-implemented method, the computer-implemented method further comprises causing rendering of a depth selection interface element, where the depth level selection is received in response to user interaction with the depth selection interface element, and where the depth selection interface element comprises a slider interface element. Additionally or alternatively, in at least some such embodiments of the example computer-implemented method, the computer-implemented method further comprises generating a recommended optimal depth level based at least in part on the data feature set, where the depth selection interface element includes an indication of the recommended optimal depth level.

In accordance with yet another aspect of the present disclosure, a computer program product for data perspective generation and visualization. In at least one example embodiment, the computer program product comprises at least one non-transitory computer readable storage medium. The at least one non-transitory computer readable storage medium comprises computer program code stored thereon. The computer program code, in execution with at least one processor, is configured for identifying a processable data set comprising at least one data record. The example computer program product is further configured for generating a perspectives set based at least in part on at least a data feature set associated with the processable data set, the perspectives set comprising at least one perspective data object comprising at least a subset of the data feature set. The example computer program product is further configured for generating, based at least in part on at least the perspectives set, a hierarchical perspectives data object representing a set of perspective detail levels, each perspective detail level of the set of perspective detail levels associated with at least one perspective data object of the perspectives set. The example computer program product is further configured for receiving a selected perspectives level indication representing a selected perspective detail level of the set of perspective detail levels, where the selected perspective detail level is associated with a selected perspective subset of the perspectives set. The example computer program product is further configured for generating, using an anomaly detection model set, an anomaly score set for at least one perspective data object of the selected perspective subset.

Additionally or alternatively, in at least some embodiments of the example computer program product, generating the perspective set based at least in part on at least the claim feature set comprises generating the perspective set utilizing a data perspectives generation model, the data perspectives generation model configured to receive the processable data set as input, where the data perspectives generation model comprises a self-supervised machine learning model.

Additionally or alternatively, in at least some embodiments of the example computer program product, the computer program product is further configured for generating the perspective set based at least in part on at least the claim feature set comprises generating the claim feature set based at least in part on at least the processable data set; and identifying at least one subset of the claim feature set, the subset of the data feature set sharing a prominent characteristic.

Additionally or alternatively, in at least some embodiments of the example computer program product, identifying the processable data set comprises retrieving the processable data set from at least one datastore.

Additionally or alternatively, in at least some embodiments of the example computer program product, identifying the processable data set comprises receiving the processable data set from a client device.

Additionally or alternatively, in at least some embodiments of the example computer program product, the computer program product is further configured for causing rendering of a perspectives analysis interface, the perspectives analysis interface comprising at least one interface element, the at least one interface element associated with (1) one or more of the anomaly score set for each perspective data object of the selected perspective subset, (2) the hierarchical perspectives data object, and (3) the processable data set.

Additionally or alternatively, in at least some embodiments of the example computer program product, the set of perspective detail levels represents, for at least a first perspective data object of the perspectives set and a second perspective data object of the perspectives set, a parent-child relationship between the first perspective data object and the second perspective data object.

Additionally or alternatively, in at least some embodiments of the example computer program product, the computer program product is further configured for generating, based at least in part on at least the perspectives set, the hierarchical perspectives data object comprises generating a perspective relations graph data object based at least in part on the perspectives set, where the perspective relations graph data object represents a set of weighted relationships between perspective data objects of the perspectives set; and generating the hierarchical perspectives data object based at least in part on at least the perspective relations graph data object.

Additionally or alternatively, in at least some embodiments of the example computer program product, receiving the selected perspectives level indication comprises causing rendering of the hierarchical perspectives data object; and receiving the selected perspectives level indication in response to user interaction with the hierarchical perspectives data object.

Additionally or alternatively, in at least some embodiments of the example computer program product, the computer program product is further configured for receiving a depth level selection, where the perspective set comprises a number of perspective data objects based at least in part on the depth level selection. Additionally or alternatively, in at least some such embodiments of the example computer program product, the computer program product is further configured for causing rendering of a depth selection interface element, where the depth level selection is received in response to user interaction with the depth selection interface element, and where the depth selection interface element comprises a slider interface element. Additionally or alternatively, in at least some such embodiments of the example computer program product, the computer program product is further configured for generating a recommended optimal depth level based at least in part on the data feature set, where the depth selection interface element includes an indication of the recommended optimal depth level.

BRIEF DESCRIPTION OF THE DRAWINGS

Figure 1:
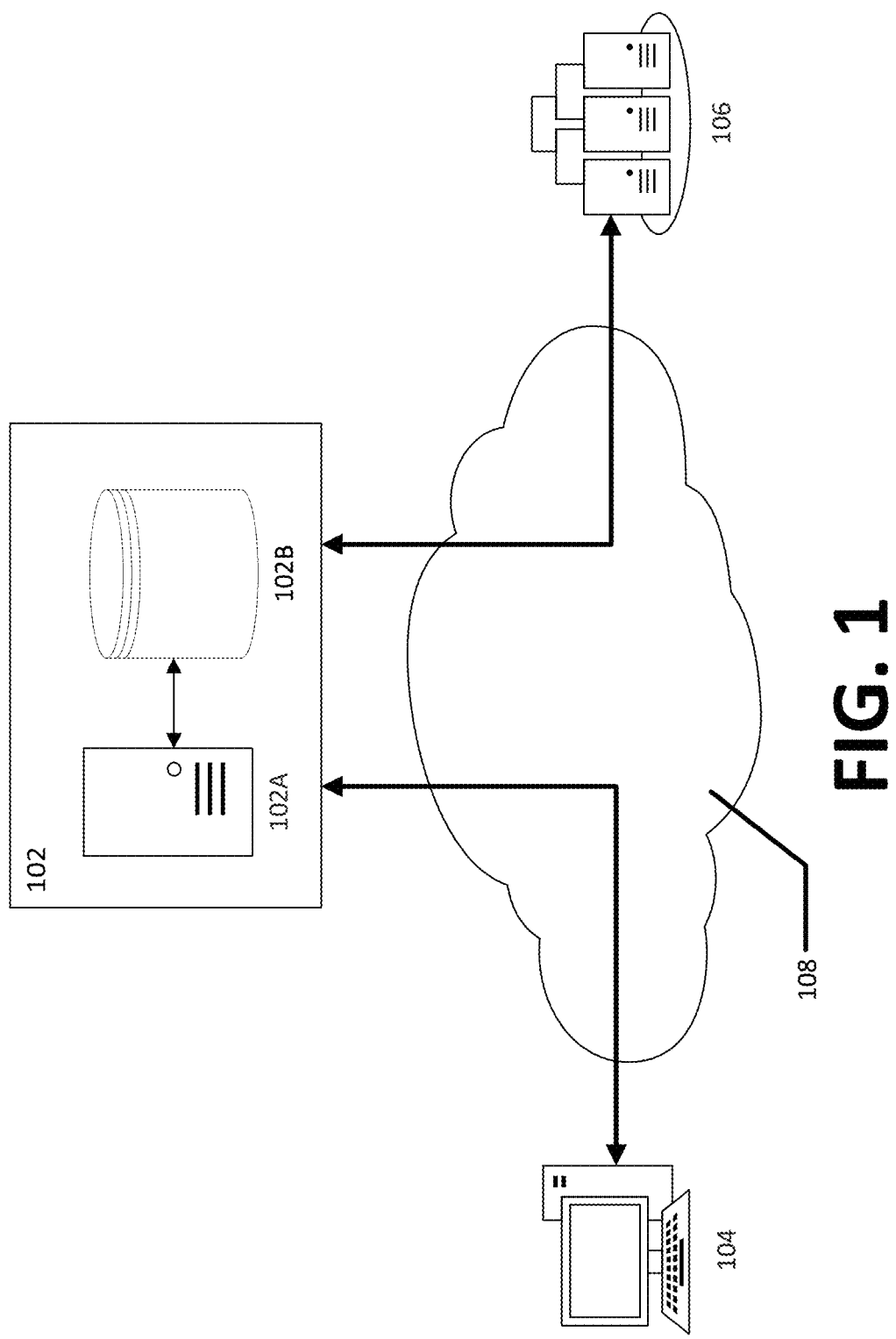
Figure 2:
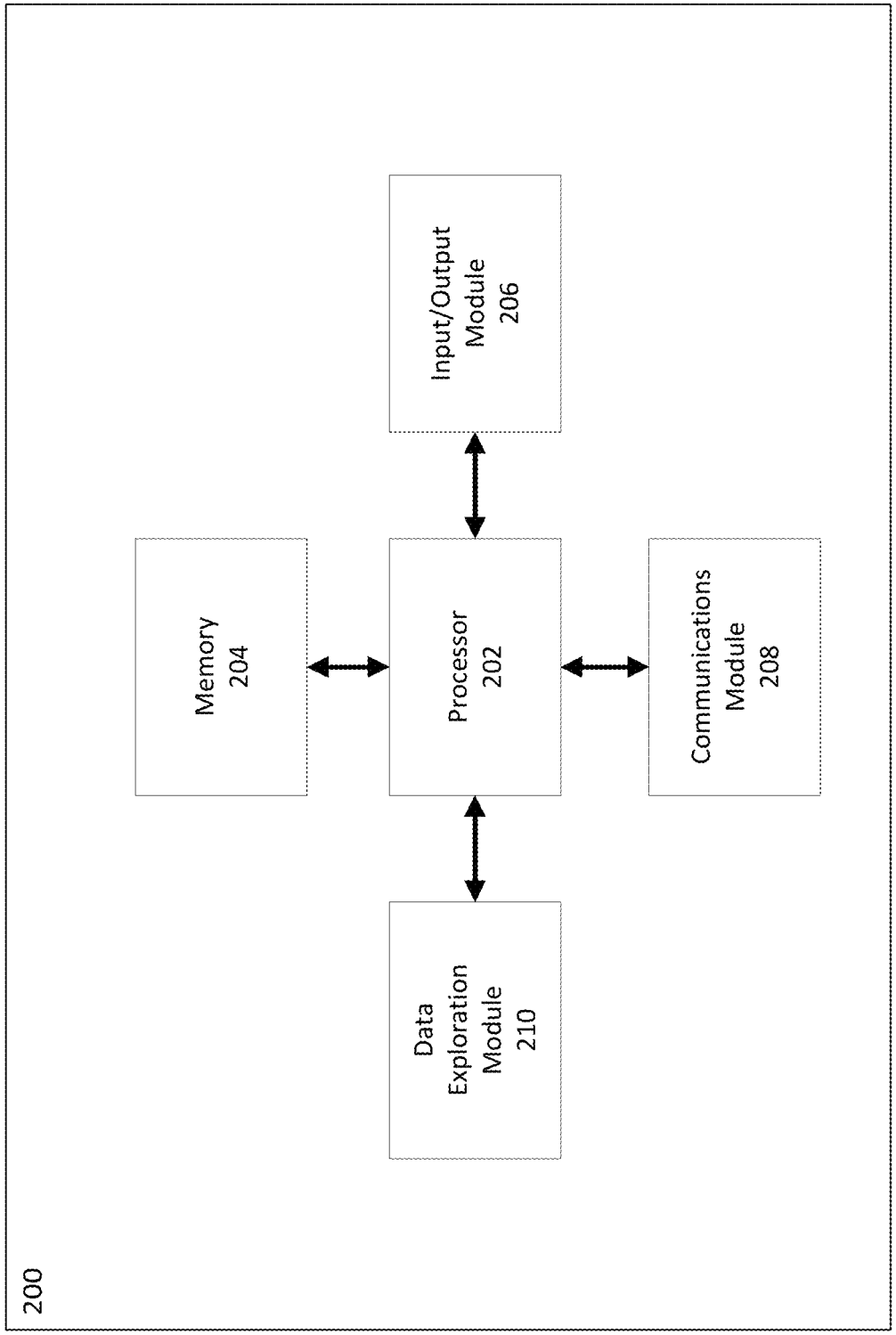
Figure 3:
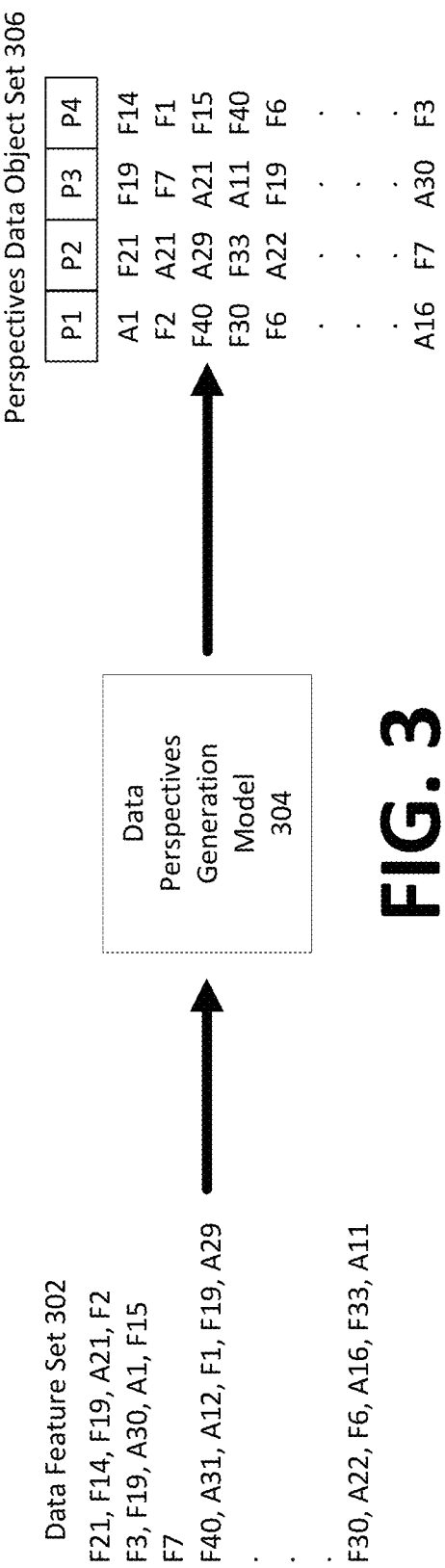
Figure 4:
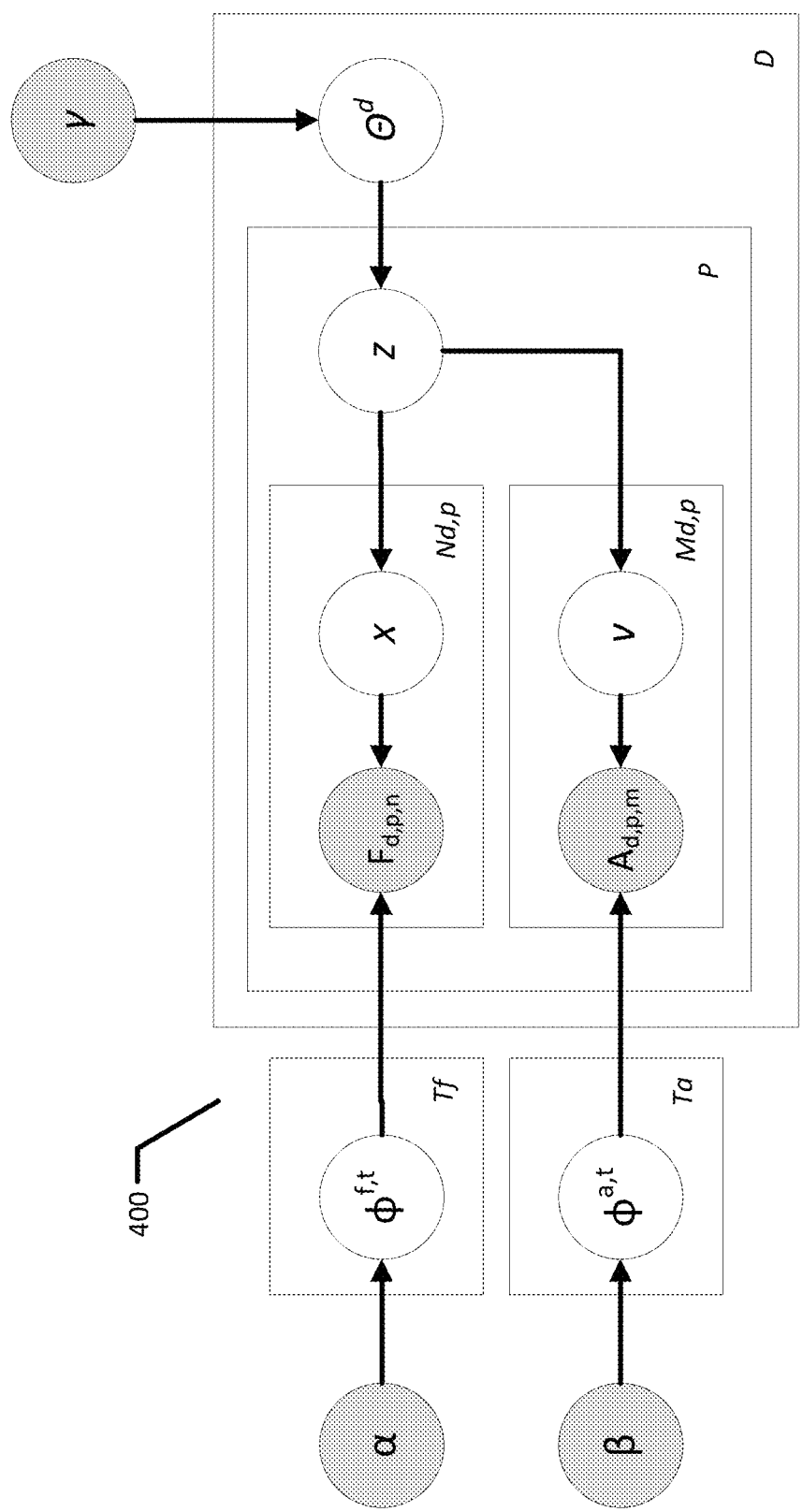
Figure 5:
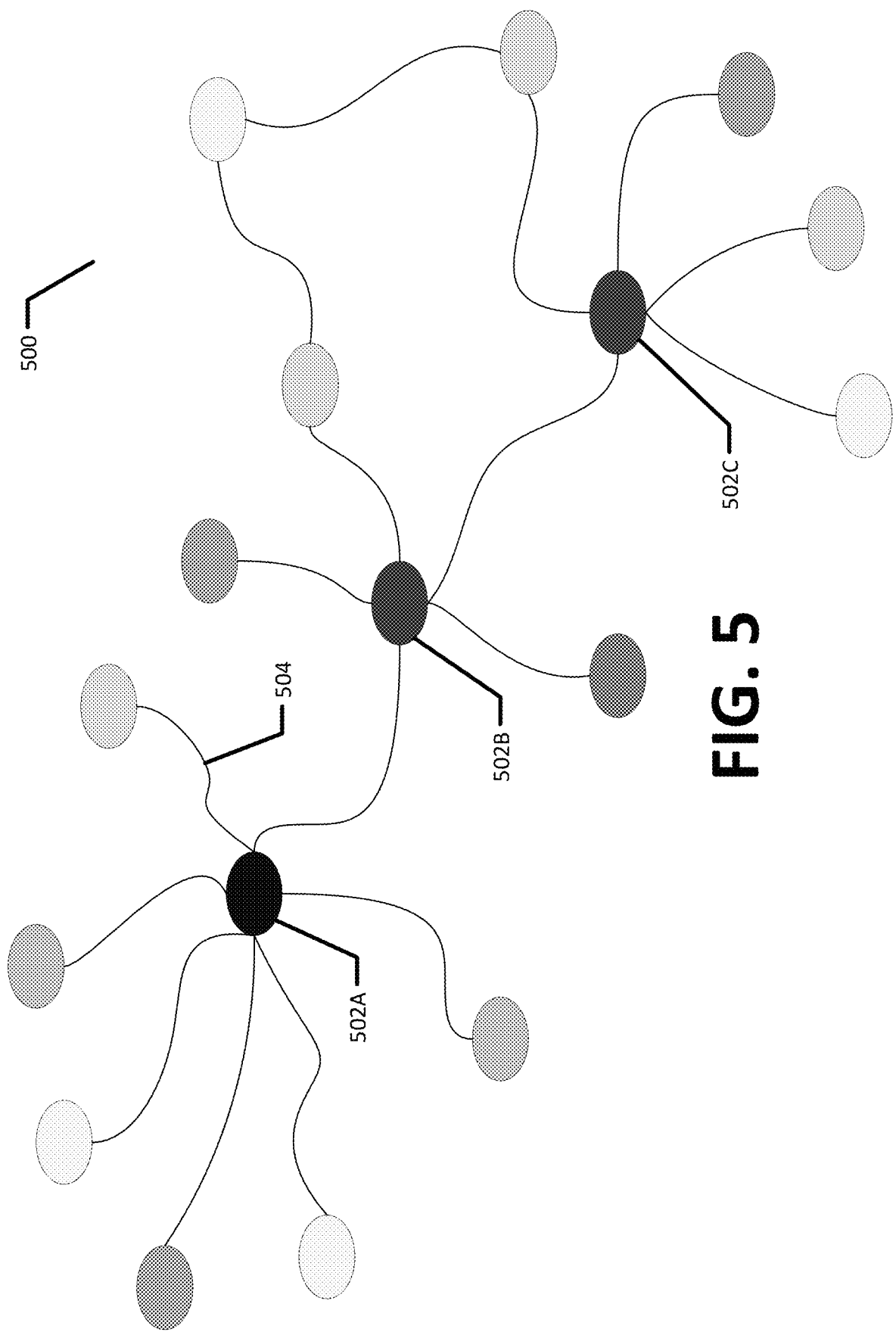
Figure 6:
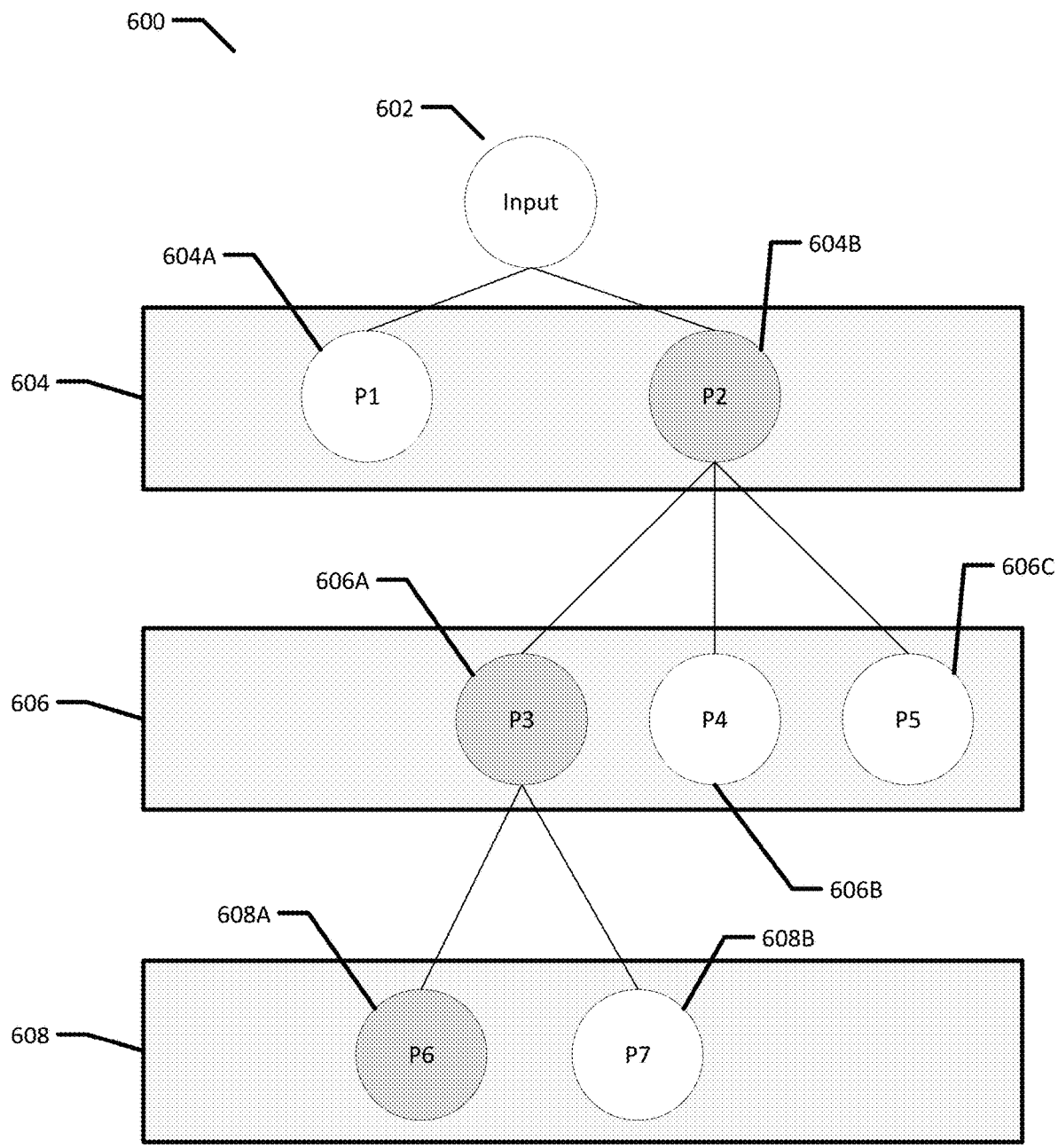
Figure 7:
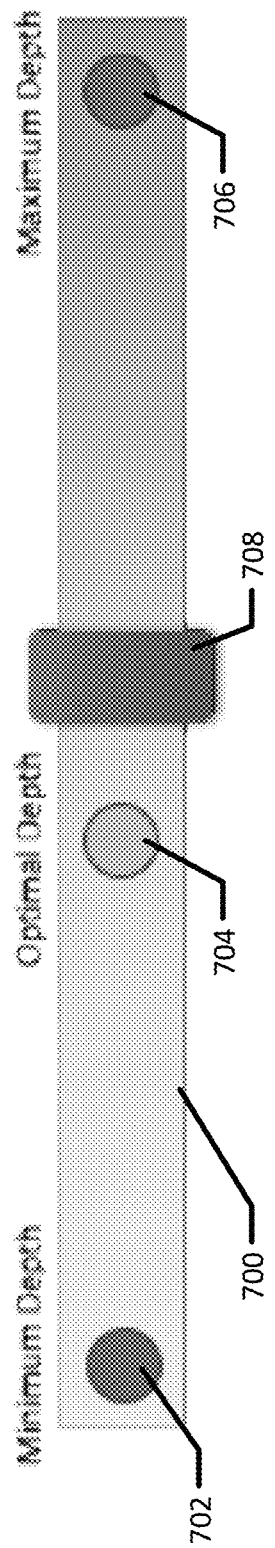
Figure 8:
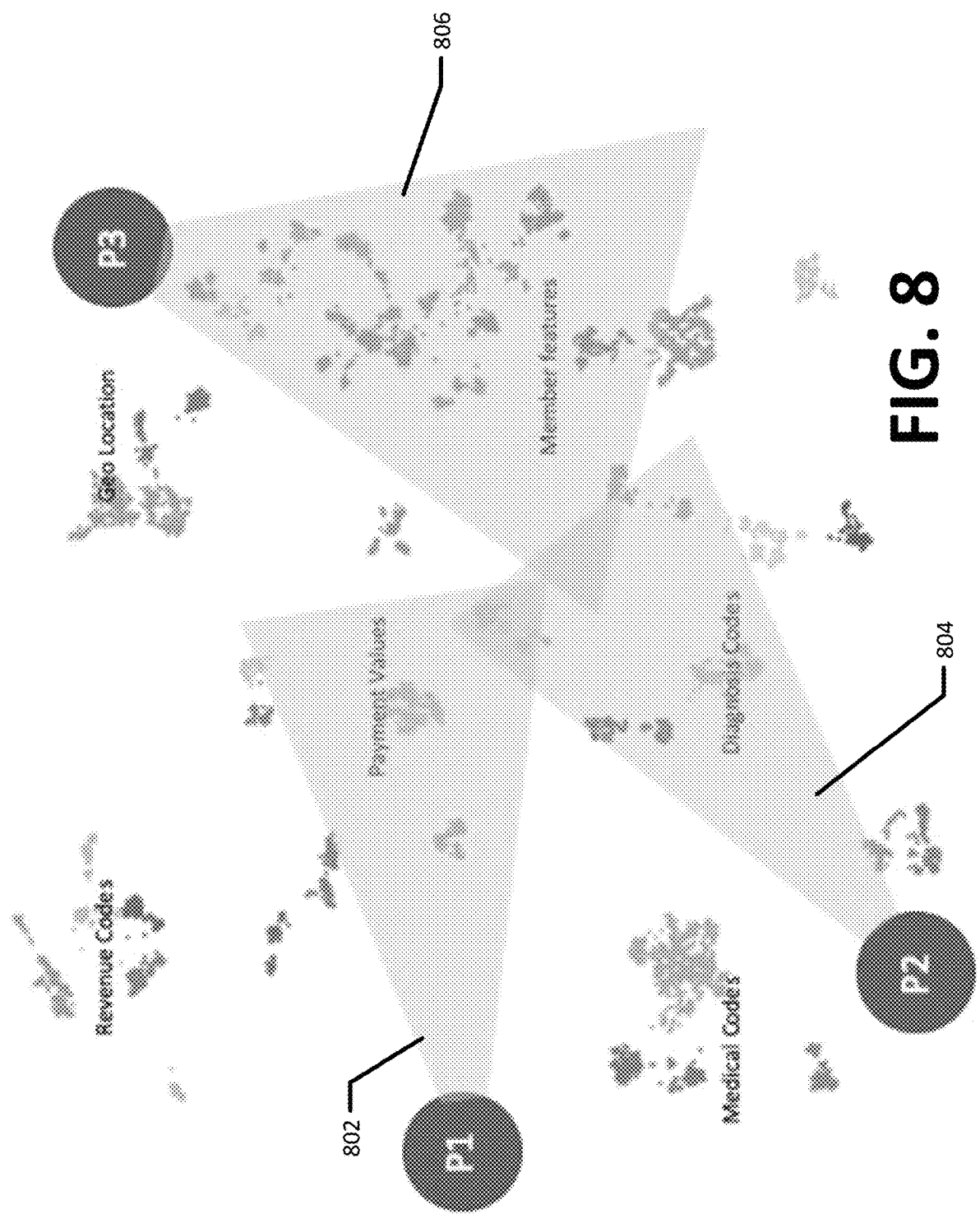
Figure 9:
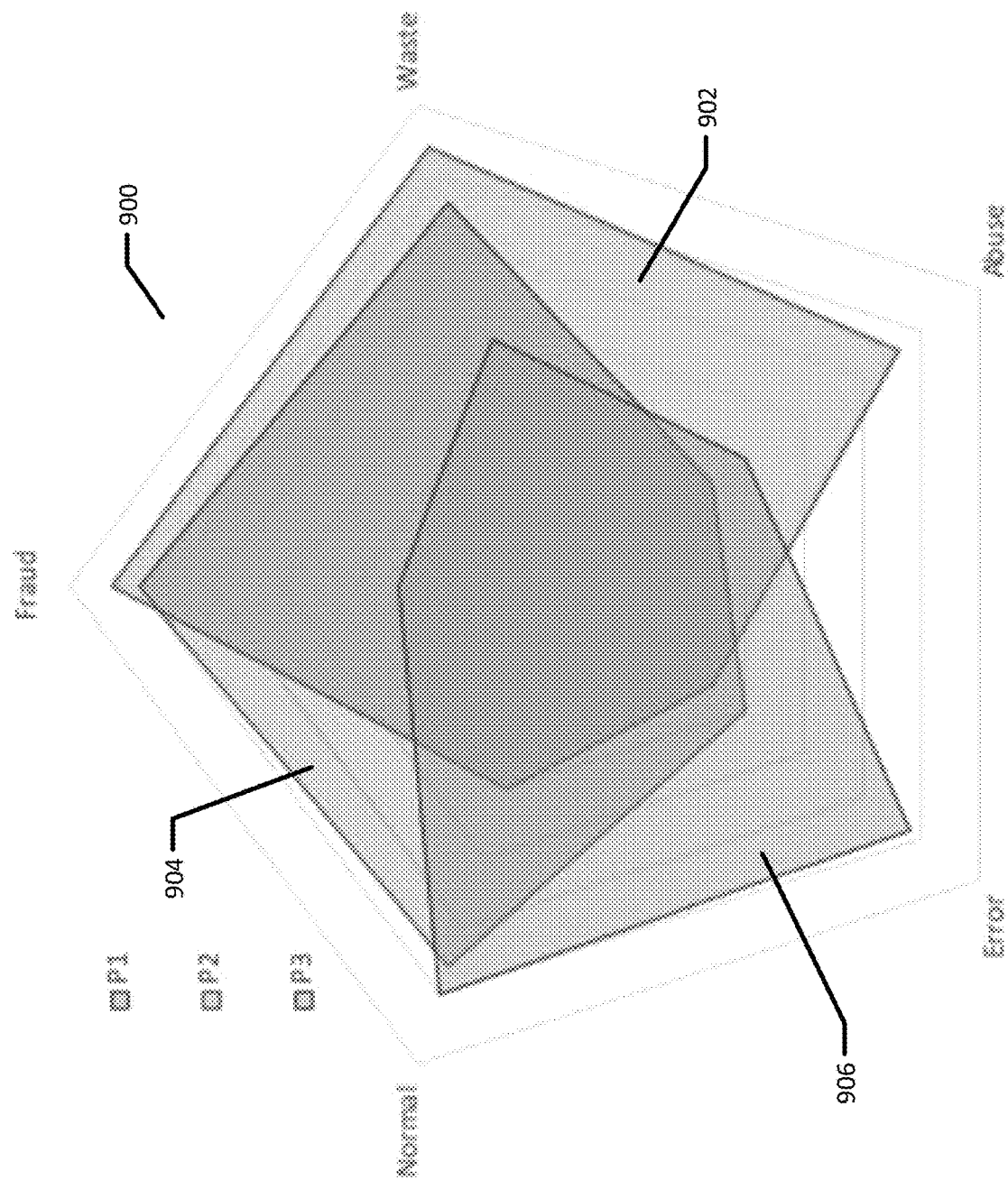
Figure 11:
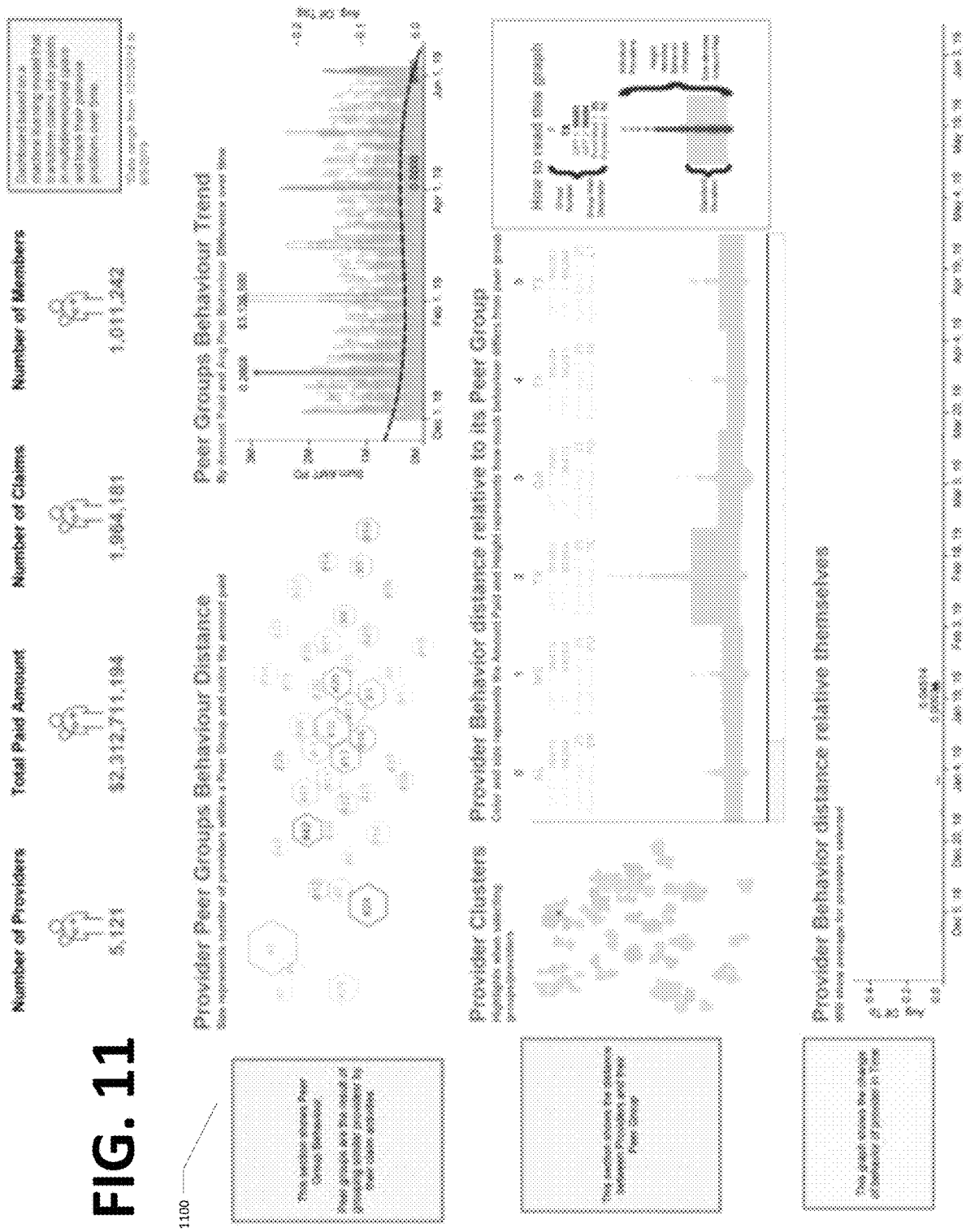
Figure 12:
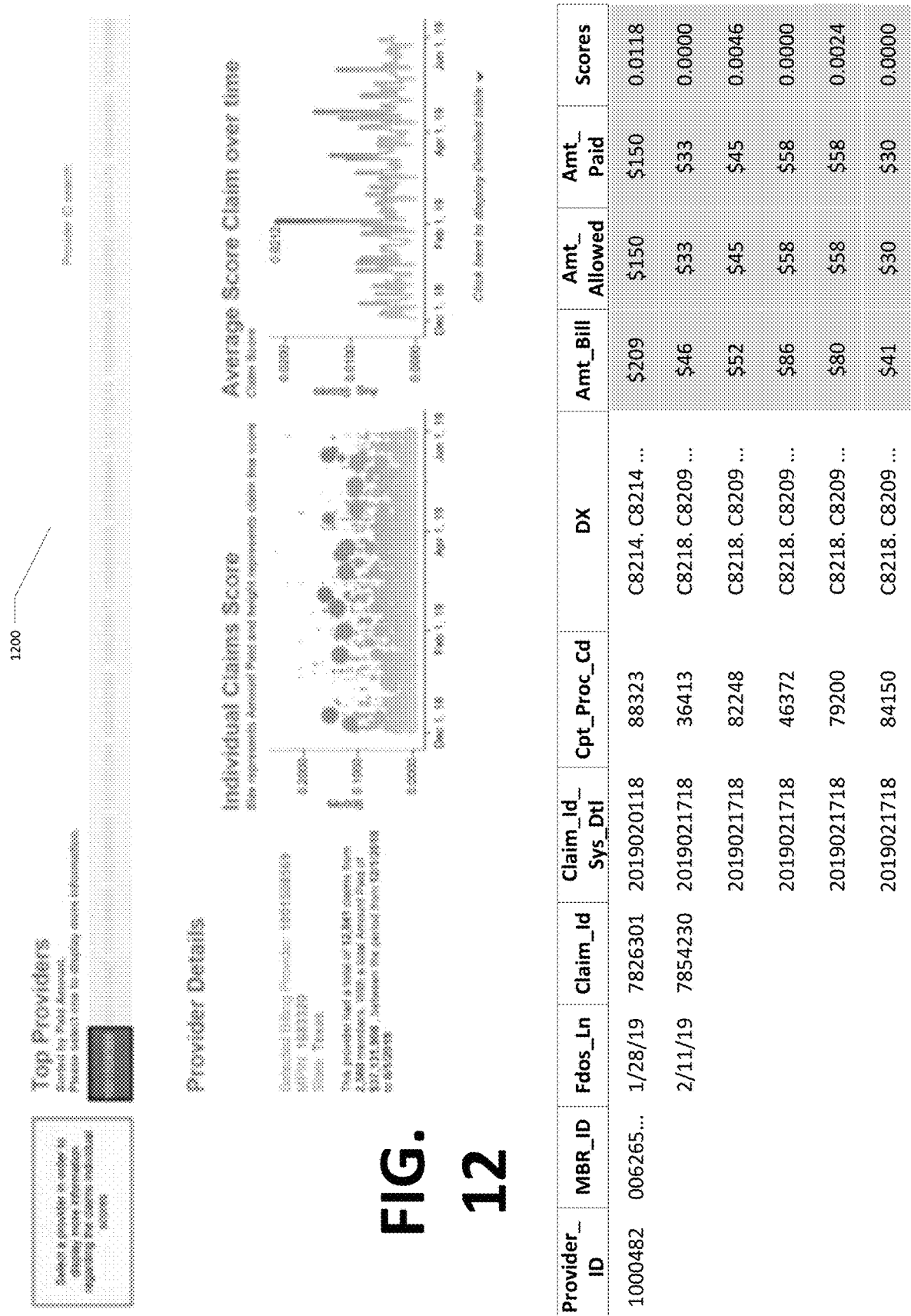
Figure 13:
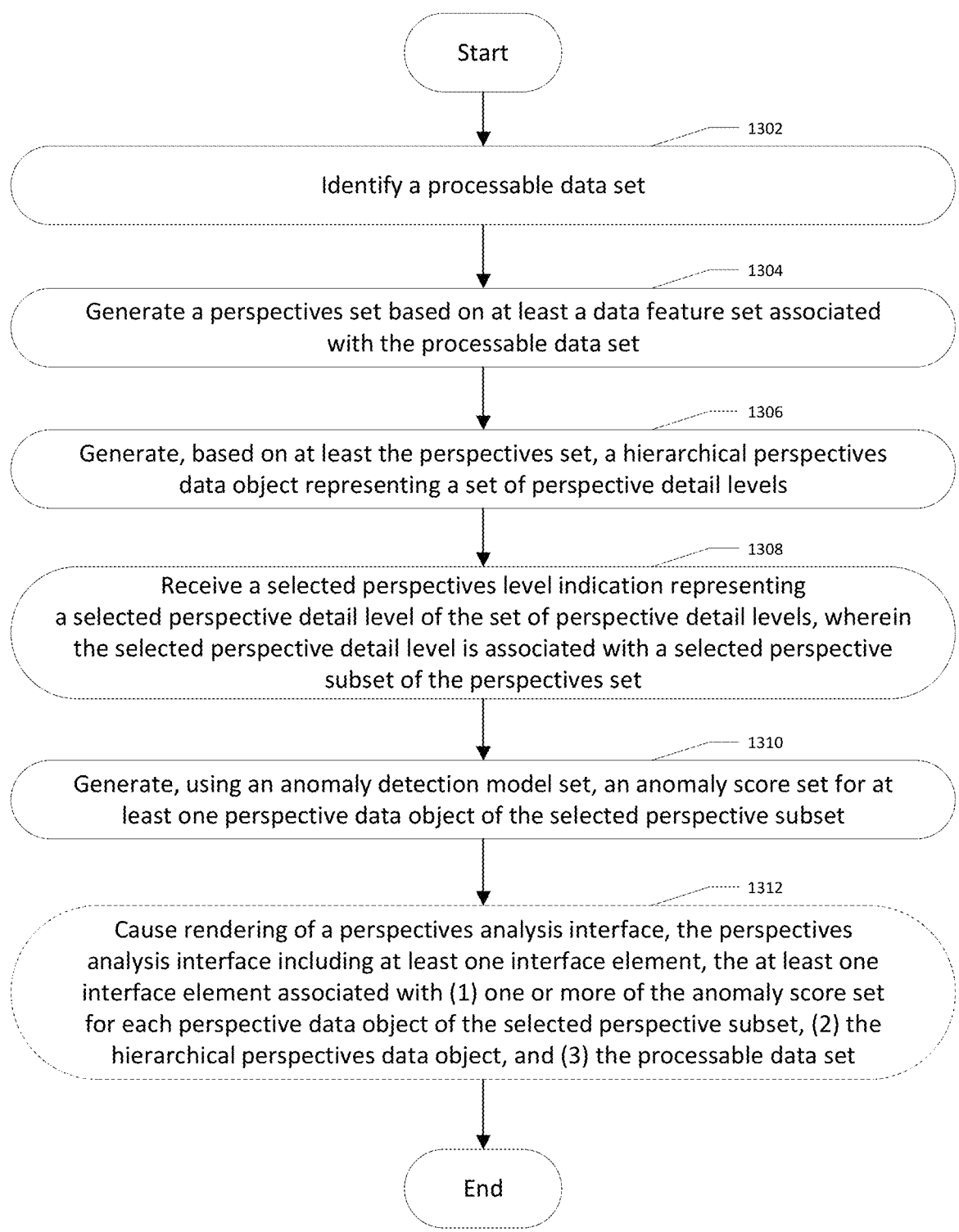
Figure 14:
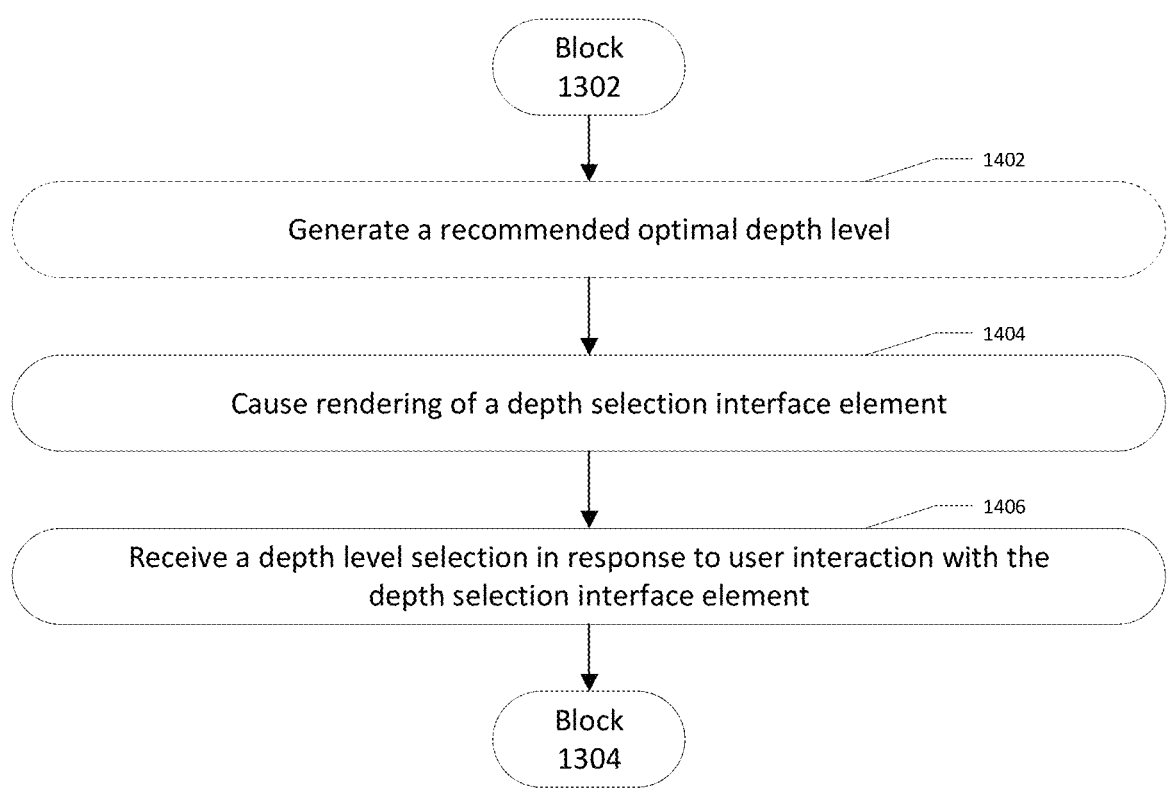
Figure 15:
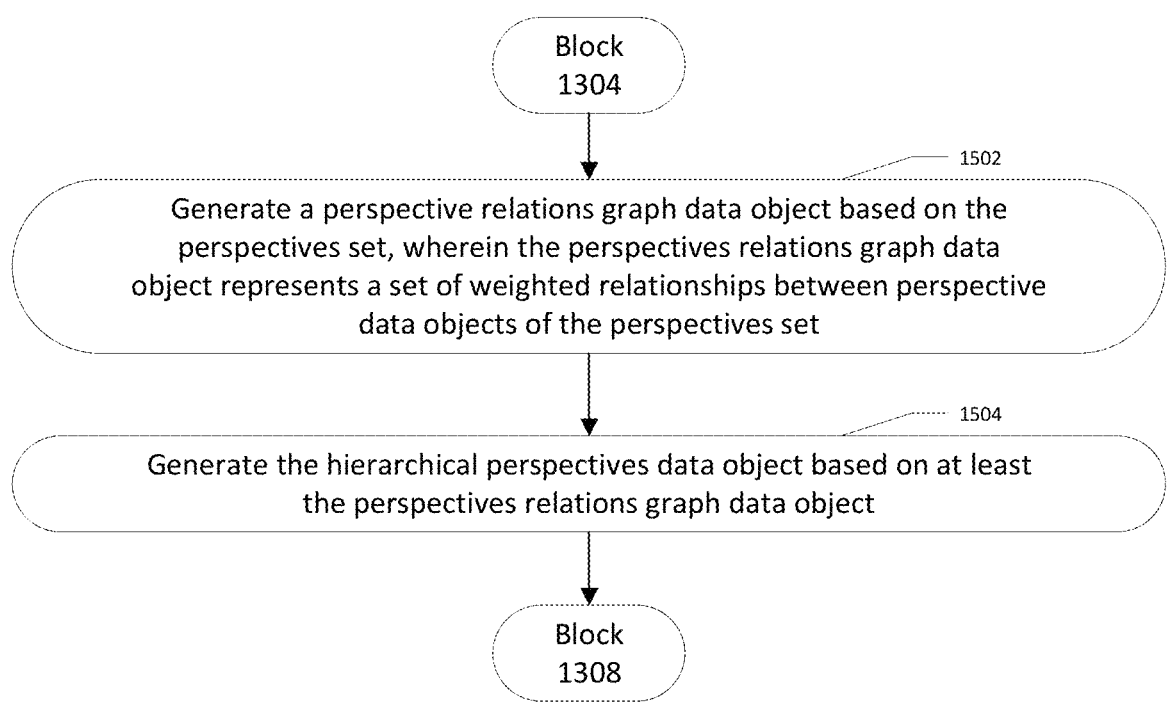
Figure 16:
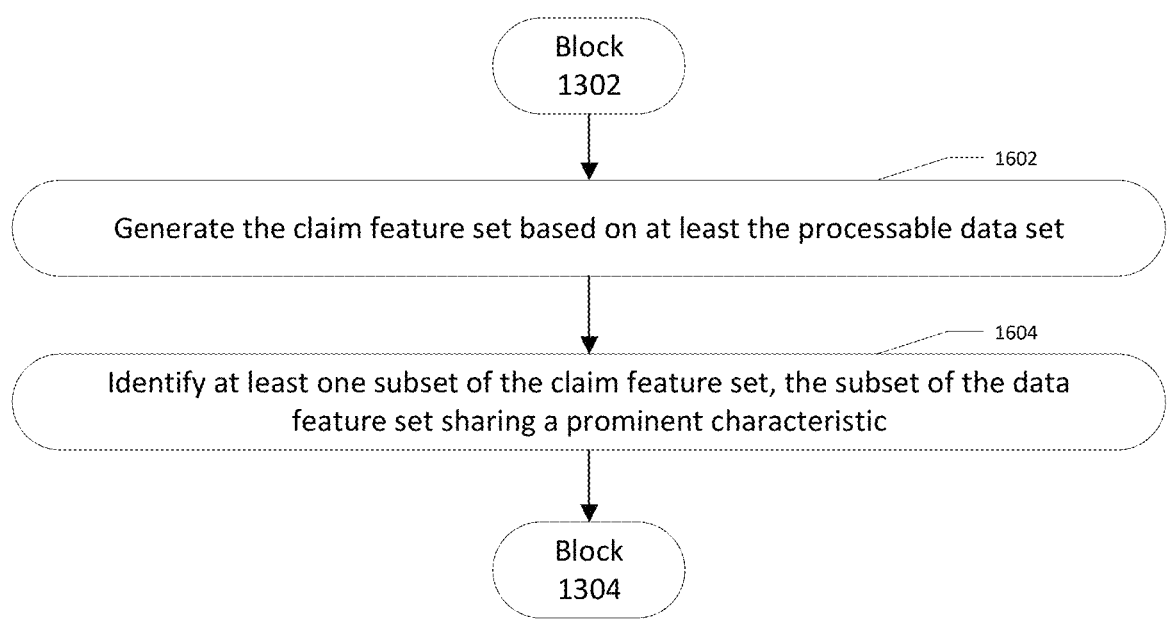
Figure 17:
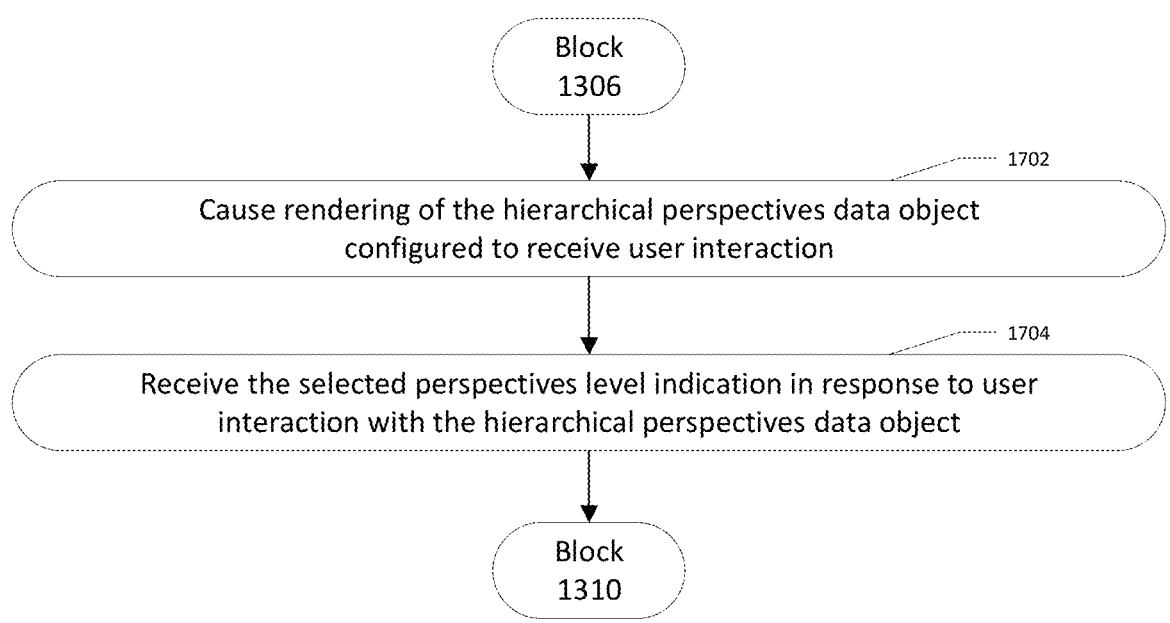

Having thus described the embodiments of the disclosure in general terms, reference now will be made to the accompanying drawings, which are not necessarily drawn to scale, and wherein:

FIG. 1 illustrates a block diagram of an example computing system within which embodiments of the present disclosure may operate;

FIG. 2 illustrates a block diagram of an example apparatus that may be specially configured in accordance with an example embodiment of the present disclosure;

FIG. 3 illustrates an example computing environment for generating a perspectives data object set associated with a data feature set, in accordance with at least one example embodiment of the present disclosure;

FIG. 4 illustrates an example data perspectives generation model, in accordance with at least one example embodiment of the present disclosure;

FIG. 5 illustrates an example visualization of an example perspective relations graph data object, in accordance with at least one example embodiment of the present disclosure;

FIG. 6 illustrates an example visualization of an example hierarchical perspectives data object, in accordance with at least one example embodiment of the present disclosure;

FIG. 7 illustrates an example depth selection interface element, in accordance with at least one example embodiment of the present disclosure;

FIG. 8 illustrates an example visualization of various perspective data objects within an example feature space, in accordance with at least one example embodiment of the present disclosure;

FIG. 9 illustrates an example visualization of each perspective data object illustrated with respect to FIG. 8 in association with various desired objectives, in accordance with at least one example embodiment of the present disclosure;

FIGS. 10A and 10B illustrate example user interface elements rendered based at least in part on processing of a processable data object set, in accordance with at least one example embodiment of the present disclosure;

FIG. 11 illustrates an example provider analysis interface, in accordance with at least one example embodiment of the present disclosure;

FIG. 12 illustrates an example claim analysis interface, in accordance with at least one example embodiment of the present disclosure;

FIG. 13 illustrates an example process for data perspective generation and visualization, in accordance with at least one example embodiment of the present disclosure;

FIG. 14 illustrates additional operations for an example process for data perspective generation and visualization, in accordance with at least one example embodiment of the present disclosure;

FIG. 15 illustrates an example process for generating a hierarchical perspectives data object, in accordance with at least one example embodiment of the present disclosure;

FIG. 16 illustrates additional operations for an example process for generating a perspectives set based at least in part on at least a future feature set associated with the processable data set, in accordance with at least one example embodiment of the present disclosure; and FIG. 17 illustrates an example process for receiving a selected perspectives level indication, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Data processing provides a useful tool for identifying and/or displaying trends, scores, and/or other information based at least in part on and/or derived from an analyzed data set. One or more users may desire to process the data set based at least in part on one or more ideas. In the context of data modeling, an idea may represent processing a data set based at least in part on one or more data features for the data set. In this regard, by exploring different ideas with respect to a data set, various trends, similarities, correlations, and/or other relations between portions of a data set may be identified and/or scored. Traditionally, to explore an idea associated with a data set, one or more data models must be specially designed, optimized, and/or fixed, often involving collaboration between various engineers and/or system designers. Changes to a model require a similar process, such that the model may be re-designed, re-optimized, and/or re-fixed based at least in part on the desired changes. When multiple ideas are desired to be explored, this complexity is repeated in each instance of a different idea to be explored.

Various embodiments herein provide for data perspective generation and visualization. In this regard, embodiments herein enable exploration of ideas from input data from one or more perspectives, represented by generated perspective data objects. Generated perspective data objects represent iterations of the idea that may be analyzed and/or compared, for example by a user, via one of the embodiments described herein. Additionally, embodiments described herein provide for generation and visualization of such perspectives without designing various model representing each perspective of a particular idea. Similarly in this regard, embodiments provide for idea exploration via the various perspectives, and/or change in perspectives, without requiring rebuilding the one or more model(s). As such, the various embodiments described herein improve the efficiency and efficacy of designing data idea exploration models, systems, and/or the like, by reducing the required resources, processing time, and complexity associated with creating such models, systems, and/or the like. In this regard, embodiments described herein may be designed and/or otherwise implemented in a shorter time frame than traditional data ideation methodologies (e.g., a few days or weeks as opposed to several months). Additionally or alternatively, example embodiments described herein further provide advantages of being flexible and adoptable without significant re-design by one or more engineers, such as one or more data analytics experts and/or data science experts, such that implementations may be readily deployed without such team members, thus advantageously providing cost savings, reducing the implementation time to deployment, and reducing the complexity of changing such systems for re-deployment.

Example Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "client device" refers to one or more user devices configured for accessing functionality of a data processing system. Non-limiting examples of client devices include a smartphone device, tablet device, personal computer, laptop, server, and the like.

The term "data processing system" refers to one or more servers, personal computers, and/or other computing hardware configured for processing a processable data set according to one or more perspective data objects. In some embodiments, a data processing system is configured via hardware, software, firmware, or a combination thereof, to generate one or more perspective data object(s) for use in processing the processable data set.

The term "datastore" refers to hardware, software, and/or a combination thereof configured to permanently store data in a retrievable format. In some embodiments, a datastore includes a local datastore, a cloud datastore, a remote datastore, or any combination thereof.

The term "data record" refers to one or more data objects stored by a data processing system. For example, in some embodiments, each data record is configured to be stored within one or more datastores.

The term "processable data set" refers to one or more data records for processing by a data processing system. In some embodiments, a processable data set is received and/or retrieved for generating one or more perspective data objects associated with the processable data set for generating one or more anomaly scores for one or more anomaly detection models.

The term "data feature" refers to a characteristics describing a data record or subset of data records in a processable data set. In some embodiments, a data feature is determined based at least in part on processing the data record or subset of data records based at least in part on one or more feature recognition algorithms, and/or utilizing one or more machine learning models. The term "data feature set" refers to any number of data features stored in one or more data types.

The term "perspective data object" refers to a set of data features and/or information derived therefrom representing a shared set of characteristics for use in processing a processable data set. In some embodiments, a perspective data object is associated with, or represents, a characteristic grouping based at least in part on an associated data feature set. The term "perspectives set" refers to zero or more perspective data objects.

The term "prominent characteristic," in reference to one or more data features or data derived therefrom, refers to a statistical similarity and/or human-describable characteristic shared various data features associated with a perspective data object. A prominent characteristic may be associated with various levels of granularity. A non-limiting example of a prominent characteristic, in the context of healthcare claim data records, includes geographic region, procedure code, procedure type, provider type, provider identity, and record timestamp. It should be appreciated that the prominent characteristic shared between features may be based on the level of granularity for such features. For example, at a first granularity level, features sharing a geographic region characteristic may be associated with the same country, whereas at a second granularity level that is more granular than the first granularity level, features sharing a geographic region characteristic may be associated with the same city.

The term "data perspectives generation model" refers to one or more algorithmic, statistical, and/or machine learning models configured to generate one or more perspective data object(s) for a processable data set. In some embodiments, a data perspectives generation model is configured to receive one or more indicators associated with a desired level of granularity and generate a corresponding number of perspective data objects based at least in part on the input indications.

The term "parent-child relationship," with respect to a first perspective data object and a second perspective data object, refers to a relationship between the data objects such that the first perspective data object represents a more generic grouping of data features than the second perspective data object. In this regard, the first perspective data object is referred to as a "parent perspective" or "parent perspective data object" and/or the second perspective data object is referred to as a "child perspective" or "child perspective data object." In some embodiments, a parent-child relationship is represented using a graph data structure, tree data structure, and/or the like.

The term "perspective relations graph data object" refers to electronically managed data representing weighted relationships between various perspective data objects of a perspectives data object set, and/or associated data features thereof. In some embodiments, for example, a perspective relations graph data object embodies weighted edges representing relationship between nodes representing a perspective data object and/or subset of associated claim features.

The term "weighted relationship" refers to electronically managed data representing a weighted relationship between the nodes of a perspective relationships graph data object. The term "set of weighted relationships" refers to zero or more weighted relationships.

The term "hierarchical perspectives data object" refers to electronically managed data representing parent-child relationships between various perspective data objects. In this regard, in some embodiments, a hierarchical perspectives data object represents the perspective data objects based at least in part on the data processing granularity associated with the perspective data object. The term "perspective detail level" refers to a representation of the data processing granularity of one or more perspective data objects of a hierarchical perspectives data object. For example, in some embodiments, such as where the hierarchical perspectives data object embodies a tree structure, each perspective data object of a hierarchical perspectives data object is associated with a perspective detail level based at least in part on the number of "branches" from the perspective data object to a root perspective data object of the hierarchical perspectives data object. In this regard, in some embodiments, each perspective data object at a perspective detail level is associated with a less data processing granularity than any perspective data object at a lower-level perspective detail level.

The term "set of perspective detail levels" refers to zero or more perspective detail levels associated with a hierarchical perspectives data object. In some embodiments, the set of perspective detail levels includes all perspective detail levels for a particular hierarchical perspectives data object.

The term "selected perspectives level indication" refers to electronically managed data representing a particular perspective detail level of a hierarchical perspectives data object chosen for use in one or more processing steps. The particular chosen perspective detail level is referred to as a "selected perspective detail level." In some embodiments, a selected perspectives level indication is received in response to user interaction with an interface element associated with the hierarchical perspectives data object.

The term "selected perspective subset" refers to one or more perspective data objects of a hierarchical perspectives data object associated with the selected perspective detail level. For example, in some embodiments, the selected perspective subset includes all perspective data objects of the hierarchical perspectives data object associated with the selected perspective detail level.

The term "anomaly detection model" refers to one or more algorithmic, statistical, and/or machine learning models configured to process a processable data set for purposes of outputting one or more scores, labels, classifications, and/or other data values associated with characteristics of one or more data records of a processable data set. For example, in at least one example context, an anomaly detection model is configured to generate one or more scores associated with detecting one or more entities associated with possible fraudulent, wasteful, and/or erroneous healthcare insurance payments. The term "anomaly detection model set" refers to zero or more anomaly detection models.

The term "anomaly score" refers to electronically managed data generated by an anomaly detection model and associated with one or more data records of the processable data set. The term "anomaly score set" refers to zero or more anomaly scores.

The term "perspectives analysis interface" refers to renderable data comprising one or more interface elements associated with visualizing one or more perspectives for the processable data set. In some embodiments, for example, a perspectives analysis interface includes one or more interface elements comprising and/or representing an anomaly score set, a hierarchical perspectives data object, and/or the like. In some embodiments, the perspectives analysis interface is configured to receive user interaction associated with one or more sub-interfaces thereof.

The term "recommended optimal depth level" refers to electronically managed data representing a predetermined and/or determined granularity level for processing a processable data set based at least in part on a number of perspective data objects. In some embodiments, for example, a recommended optimal depth level represents, or otherwise is associated with, the number of perspective data objects to be generated associated with a processable data set. In some embodiments, a data processing system is configured to generate the recommended optimal depth level.

The term "depth level selection" refers to electronically managed data indicating a desired level of granularity for processing a processable data set based at least in part on an associated number of perspective data objects. In some embodiments, for example, the depth level selection indicates a user-selected level of granularity associated with a number of perspective data objects for use in processing a processable data set.

The term "depth selection interface element" refers to electronically managed data representing a component to be rendered to an interface for enabling user interaction representing a depth level selection. For example, in some embodiments, a depth selection interface element is configured to receive user interaction, where the user interaction is associated with a depth level selection.

The term "slider interface element" refers to a component to be rendered to an interface and configured to enable positioning of a slider within the component, where the position of the slider corresponds to a particular data value for processing. In some embodiments, a slider interface element is configured to enable user interaction for repositioning the slider within the slider interface element, for example via click-and-drag and/or another drag-and-drop action. In some embodiments, a depth selection interface element includes and/or is embodied by a slider interface element, where the position of the slider represents and/or otherwise corresponds to (for example through one or more mathematical transformations) a depth level selection.

The term "user interaction" refers to signals representing one or more user actions, executed via a client device, for indicating the user has performed an action associated with the generated signals. Non-limiting examples of a user interaction include a button press, a mouse click, a tap, a gesture, movement of a client device and/or associated peripheral, a keystroke, a voice command, an eye gesture, and a controller device.

Example System Environment and Apparatuses

FIG. 1 illustrates an example computing system within which embodiments of the present disclosure may operate. As illustrated, the system includes data processing system 102. The data processing system 102 embodies one or more computing devices specially configured to enable data perspective generation and visualization. In this regard, the data processing system 102 may be configured via hardware, software, and/or a combination thereof, to perform one or more of the operations described herein.

As illustrated, the data processing system 102 comprises data processing server 102A ("server 102A") and data processing repository 102B ("repository 102B"). Data processing server 102A comprises one or more servers, personal computers, and/or other computing hardware specially configured to receive one or more data transmissions from one or more connected devices and/or systems, process one or more data transmissions and/or associated data, and/or transmit one or more data transmissions to the one or more connected devices. In some embodiments, for example, the server 102A is configured to receive data for processing and/or one or more requests to process data for perspective generation and/or visualization. Additionally or alternatively, in some embodiments, the server 102A is configured to generate one or more data objects associated with data perspective generation and visualization, for example based at least in part on at least identified and/or received data. In some embodiments, the server 102A is configured to generate one or more perspective data objects for a processable data set, generate one or more data objects derived therefrom. Additionally or alternatively, in some embodiments, the server 102A is configured to cause rendering of one or more interfaces associated with data perspective generation and visualization, for example to a display and/or a display associated with one or more external systems.

Repository 102B comprises one or more servers, personal computers, and/or computing hardware configured for storing any number of data records associated with any number of data object types. In some embodiments, the repository 102B is configured in communication with the server 102A, for example such that the server 102A is configured to store data via the repository 102B and/or retrieve such data for later processing. In this regard, in some embodiments, repository 102B is configured to permanently and/or temporarily store data for use in data perspective generation and visualization. In some embodiments, repository 102B is configured to store one or more received and/or identified data embodying a processable data set for processing by the server 102A.

It should be appreciated that the repository 102B may be embodied in any of a myriad of configurations utilizing any of a number of computing devices. For example, in some embodiments the repository 102B is embodied by one or more network attached storage ("NAS") devices. Additionally or alternatively, in some embodiments, the repository 102B comprises one or more remote, or "cloud," storage devices and/or systems accessible to the data processing system 102, for example via communication with data processing system 102. Additionally or alternatively still, the repository 102B comprises at least one or more locally controlled hardware/and/or software systems.

FIG. 1 further includes third-party data system 106. In some embodiments, the third-party data system 106 comprises one or more computing devices, servers, and/or the like, communicable with the data processing system 102 to enable access to one or more data records. For example, in some embodiments, the third-party data system embodies a computing system associated with a data aggregator and/or collector, for example a healthcare data aggregator, provider data system, and/or the like. In this regard, the data processing system 102 may communicate with the third-party data system 106 to retrieve such information embodying, or for inclusion in, a processable data set for exploration.

FIG. 1 further includes client device 104. Client device 104 may embody one or more computing devices, systems, and/or other computing hardware for accessing the data processing system 102. In some embodiments, for example, the client device 104 is embodied by one or more user devices, comprising, without limitation, a smart phone device, tablet device, wearable device, personal computer, laptop computer, personal digital assistant, and/or the like. In some embodiments, the client device 104 is configured to access functionality associated with the data processing system 102 via one or more software applications executed via the client device 104. For example, in some embodiments, the client device access es the data processing system 102 via a native software application installed and/or otherwise executed on the client device 104. Additionally or alternatively, in some embodiments, the client device 104 accesses the data processing system 102 via a web-application accessible on the client device 104 via a browser application installed to and/or otherwise executed on the data processing system 102.

In some embodiments, the client device 104 is configured to provide various functionality via one or more software and/or hardware modules embodied therein. For example, in some embodiments the operating system of the client device 104 provides various functionality for local data storage, data processing, data communication (for example, to the data processing system 102) and/or the like. It should be appreciated that in this regard, one or more software modules may provide various application programming interfaces ("APIs") for use in providing such functionality with respect to one or more other software applications and/or the like. As such, one or more applications associated with accessing the data processing system 102 may utilize such functionality to perform one or more of the operations described herein.

FIG. 2 illustrates a block diagram of an example apparatus configured in accordance with at least one example embodiment of the present disclosure. In some embodiments, the data processing system 102 may be embodied by one or more computing systems, such as the apparatus 200. The apparatus 200 includes, in at least some embodiments, a processor 202, a memory 204, an input/output module 206, a communications module 208, and a data exploration module 210. In some embodiments, the apparatus 200 may be configured, utilizing one or more of the modules, to execute the operations described herein.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure. It should be appreciated that the memory 204 may be embodied by any number of sub-memory devices, and/or the like, configured to function independently and/or in conjunction with one another.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In at least one example context, the processor 202 may be configured to generate one or more perspective data objects and/or visualizations, for example one or more associated interfaces, for a processable data set. For example, in some embodiments the processor 202 identifies and/or receives a processable data set. Additionally or alternatively, in some embodiments the processor 202 generates one or more perspective data objects associated with the processable data set. Additionally or alternatively, in some embodiments, the processor 202 generates a hierarchical perspectives data object based at least in part on the perspective data objects for the processable data set. In some embodiments, the processor 202 further performs one or more intermediary processing steps, such as for generating a perspectives graph data object, receiving data representing user input, and/or generating one or more scores based at least in part on associated data processing models. In yet some embodiments, additionally or alternatively, the processor 202 further transmits one or more signals comprising the generated data and/or for rendering one or more interfaces associated one or more of the generated data object(s).

In some embodiments, the processor 202 is configured for managing one or more data objects. For example, in some embodiments the processor 202 is configured to store and/or retrieve data records representing a processable data set. In some embodiments, the processor 202 is configured for communicating with one or more external systems, such as one or more third-party systems, for storing and/or retrieving data records. The processor 202 may further be configured for communicating with one or more client devices for causing rendering of one or more associated interfaces.

In some embodiments, the apparatus 200 may include input/output module 206 that may, in turn, be in communication with processor 202 to provide output to the user and, in some embodiments, to receive an indication of a user input. The input/output module 206 may comprise one or more user interfaces, rendered via a display associated with the apparatus 200 or rendered to a display of an associated client device, and/or may include a display to which the user interface is rendered. In some embodiments, the input/output module 206 may comprise a web user interface, a mobile application, a desktop application, a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communication network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). In some embodiments, the communications module 208 includes hardware, software, firmware, and/or a combination thereof to enable communication with one or more client device(s). Additionally or alternatively, in some embodiments, the communications module 208 includes hardware, software, firmware, and/or a combination thereof to enable communication with one or more third-party system(s).

The data exploration module 210 includes hardware, software, firmware, and/or a combination thereof, configured to support functionality associated with identifying and processing a processable data set by the data processing system 102. In some embodiments, the data exploration module 210 communicates with processing circuitry, such as the processor 202, to perform one or more of these actions. In some embodiments, the data exploration module 210 includes hardware, software, firmware, and/or a combination thereof, to identify a processable data set comprising at least one data record, and/or process the processable data set. For example, in some embodiments, the data exploration module 210 includes hardware, software, firmware, and/or a combination thereof to generate a perspectives set based at least in part on a data feature set associated with the processable data set, generate a hierarchical perspectives data object based at least in part on at least the perspectives set, receive a selected perspectives level indication associated with a selected perspective detail level for the hierarchical perspectives data object, and generate an anomaly score set for a selected perspective subset of the perspectives set based at least in part on the selected perspectives level indication. Additionally or alternatively, in some embodiments, the data exploration module 210 includes hardware, software, firmware, and/or a combination thereof, configured to perform one or more additional operations, for example to generate the perspective set utilizing a data perspectives generation model based at least in part on at least the processable data set, generate a perspectives relations graph data object based at least in part on the perspectives set (for example, for use in generating the hierarchical perspectives data object), receiving and/or processing a depth level selection, and/or generating a recommended optimal depth level for a processable data set, for example based at least in part on a data feature set. Additionally or alternatively, in some embodiments, the data exploration module includes hardware, software, firmware, and/or a combination thereof, configured to cause rendering of one or more interfaces and/or interface elements associated with processing a processable data set, for example causing rendering of a perspectives analysis interface, causing rendering of a hierarchical perspectives data object, and/or causing rendering of a depth selection interface element. In some embodiments, the data exploration module 210 communicates with and/or otherwise utilizes one or more of the other modules for performing one or more of these actions, for example communications module 208 for transmitting signals to a client device for causing rendering of one or more interfaces and/or receiving signals representing user interaction with one or more interfaces, and/or the input/output module 206 for causing rendering of the one or more interfaces and/or receiving signals receiving signals representing user interaction with the one or more interfaces. It should be appreciated that, in some embodiments, the data exploration module 210 may include a separate processor, specially configured field programmable gate array (FPGA), or a specially configured application-specific integrated circuit (ASIC).

In some embodiments, one or more of the aforementioned components is combined to form a single module, such that any of the aforementioned modules are combined into a combined module. For example, in some embodiments, the data exploration module 210 and processor 202 are combined into a single module. The combined module may be configured to perform some or all of the functionality described above with respect to the individual modules. Additionally or alternatively, in some embodiments, one or more of the modules described above may be configured to perform one or more of the actions described with respect to one or more of the other modules.

Example Visualizations of Computing Environments and Interfaces

FIGS. 3-12 illustrate various aspects of example computing environments and interfaces managed by embodiments of the present disclosure. In this regard, it should be appreciated that the embodiments may function in the context described above with respect to the system as described above with respect to FIG. 1 and/or as the apparatus described above with respect to FIG. 2. For example, in some embodiments, the data processing system 102 embodied by the apparatus 200 may be configured to generate and/or manage the computing environments depicted below and/or one or more of the associated interfaces as depicted and described.

FIG. 3 illustrates an example computing environment for generating a perspectives data object set associated with a data feature set in accordance with at least one example embodiment of the present disclosure. In some embodiments, for example, the apparatus 200 is configured to manage the computing environment and/or associated data as depicted and described. In some such embodiments, the apparatus 200 is in communication with one or more other devices, systems, and/or the like, for example one or more client devices and/or third-party systems.

As illustrated, FIG. 3 illustrates generation of a perspectives data object set 306 for an associated data feature set 302. In some embodiments, the data feature set 302 is associated with one or more data records embodying a processable data set. It should be appreciated that the data records associated with the data feature set 302 may be identified in any of a myriad of ways, as described herein. For example, in some embodiments, some or all of the data feature set 302 is retrieved, for example from at least one datastore. Alternatively or additionally, in some embodiments, some or all of the processable data set is received from one or more client devices.

The data feature set 302 may represent one or more characteristics associated with some or all data records in the processable data set. For example, the data feature set 302 may include any number of feature data objects, each representing a data value associated with a characteristic of the processable data set. In this regard, in some embodiments, the data feature set 302 is generated by processing a processable data set using one or more statistical, algorithmic, and/or machine learning models. Alternatively or additionally, in some embodiments, the data perspectives generation model 304 receives the processable data set and includes one or more sub-models configured to generate the data feature set 302 based at least in part on at least the processable data set. In at least one example context, the data perspectives generation model 304, and/or a sub-model thereof, is configured to generate one or more metadata features associated with an input data set, such as a unique number of each feature, payment ranges for various claims and/or payment ranges for data records associated with another shared property, and/or the like. The perspective generation model 304 may then process the metadata features to generate a determined optimal number of perspective data objects based on at least on the metadata features, each perspective data object sharing a prominent feature. For example, in at least one example in the context of healthcare claims analysis, a first perspective data object may share a prominent feature of a certain number of CPT codes, and a second perspective data object may share a prominent feature of a mix of CPT codes and member features, such as gender, age, and the like, and/or a combination thereof.

In at least one example context, for example, the data feature set 302 comprises one or more features associated with a processable data set comprising healthcare claim data records. In this regard, the data feature set 302 may represent any number of characteristics associated with the healthcare claim data records, comprising without limitation, value ranges, cardinality number, feature coverage, feature sparsity, feature correlations, number of records, unique identifiers, potential claim grouping, datetime features, and/or the like. In some embodiments, each feature of the data feature set 302 may be associated with one or more further classifications regarding the usability of the feature for one or more intended purposes. For example, continuing the example context of healthcare claim data records, a feature may be classified as an "actionable feature" (depicted as with the letter "A" followed by a number, such as "A21") in a circumstance where the feature is determined, marked, and/or otherwise indicated as actionable in the context of an anomaly healthcare claim data investigation, or may be classified as a "supportive feature" (depicted with the letter "F" followed by a number, such as "F14") in a circumstance where the feature provides explanatory correlative power to an anomaly healthcare claim data investigation but is not actionable for further investigation.

As illustrated, in some embodiments, a data perspectives generation model 304 is maintained to generate a perspectives data object set from an input data feature set, for example to generate perspectives data object set 306 from the data feature set 302. In this regard, the data perspectives generation model 304 may be specially designed and/or configured to generate one or more perspective data objects from the feature data objects included in the input data feature set, such as the data feature set 302. In this regard, each generated perspective data object may include and/or otherwise be associated with a subset of the data feature set, where each feature data object of the subset shares one or more prominent characteristic(s). As such, each generated perspective data object may represent a different view of the feature space represented by the various feature data objects of the data feature set 302. In this regard, each perspective data object may represent a subset of the feature set associated with a different idea for exploring correlations between various data records of the processable data set, specifically based at least in part on the prominent characteristic(s) shared between the feature data objects of the data feature set 302.

In some embodiments, the data perspectives generation model 304 comprises one or more algorithmic, statistical, and/or machine learning models. In some such embodiments where the data perspectives generation model 304 is embodied by, or includes, one or more machine learning model(s), it should be appreciated that the machine learning model(s) may be trained by one or more embodiments described here, for example by the apparatus 200 as described above, and/or by one or more associated systems. For example, in some embodiments, the data perspectives generation model 304 is trained via one or more external systems and transmitted to the apparatus 200 for use. A non-limiting example data perspectives generation model is depicted by data perspectives generation model 400 as illustrated in FIG. 4. In at least one example embodiment, α, β, and γ each represent parameters of Dirichlet distribution priors for use in the example illustrated data perspective generation model 400. For an example process embodied by the data perspectives generation model 400, consider processing of a collection of claim data objects d, where d includes a number of claims such as {p1, p2, . . . pn}, where each claim p of the set d represents a sequence of features denoted by T. For the conditional probability of P(Pn|Dn), the joint probability P(Pn, Dn) can be determined. In at least one example context, an algorithm for generating the perspective data objects, the data perspectives generation model 400 is configured to, for each set of claim data objects (for example, a subset of a larger dataset of claim data objects), draw the perspectives from $\theta^d \sim Dir(\gamma)$. For each claim p, the model 400 draws two separate perspective distributions, a first from $\varphi^{f,t} \sim Dir(\alpha)$ and a second from $\varphi^{a,t} \sim Dir(\beta)$. For each feature I in claim p of subset d, the model 400 is configured to: choose a perspective $X_{Nd,p} \sim \varphi^{f,t}$ from a first perspective aspect set of descriptive features sets; choose an action perspective $V_{Md,p} \sim \varphi^{a,t}$ from a second perspective action set of action features sets; and choose an aspect-action relationship perspective $Z_{p,d}$ from an aspect-action distribution $\theta^{d,z}$. In this regard, to obtain the distributions of $\theta^d$, $\varphi^{f,t}$ and $\varphi^{a,t}$, the model 400 first generates an estimate for the posterior distribution over $X_{Nd,p}$ and $V_{Md,p}$, and then over $Z_p = z$. Upon generating these estimates, the model 400 then calculates the conditional distribution represented by $P(Z_p = z, X_{Nd,p} = x, V_{Md,p} = v | z\neg, x\neg, v\neg, A, F)$. It should be appreciated that data perspectives generation model 400, as illustrated, is merely one example model for generating a set of perspectives data objects. In other embodiments, it should be appreciated that one or more additional and/or alternative data perspectives generation model(s) may be utilized in place of, and/or in conjunction with, the data perspective generation model 400.

The generated perspectives data object set 306 may include any number of perspective data objects. As the number of perspective data objects increases, one or more of the perspective data objects may provide more detailed granularity with respect to the various characteristics associated with the data feature data objects. In some embodiments, the number of perspective data objects within the generated perspectives data object set 306 is automatically predetermined, and/or determined based at least in part on one or more algorithms, for example by the apparatus 200. Additionally or alternatively, in some embodiments, a depth level selection is received that represents and/or is utilized to determine the number of perspective data objects to be generated. In this regard, the depth level selection may represent a user inputted and/or system determined desired level of granularity for which to process a processable data set. In some embodiments, the depth level selection is determined and/or received based at least in part on user interaction with one or more interface elements as described herein, for example such that a user may adjust the desired level of granularity.

In some embodiments, a perspectives data object set and/or data feature set, such as the perspectives data object set 306 and/or data feature set 302, are further processed to generate a perspective relations graph data object. In this regard, in some such embodiments, the perspective relations graph data object represents a set of weighted relationships between perspective data objects of the perspectives set. FIG. 5 illustrates an example visualization of a perspective relations graph data object that may be generated for some or all of the perspective data objects in the perspectives data object set 306. It should be appreciated that some embodiments are configured to generate a perspective relations graph data object representing a set of weighted relationships for all perspective data objects in the generated perspectives data object set.

Specifically, FIG. 5 illustrates an example visualization of a perspective relations graph data object 500. The perspective relations graph data object 500 embodies a weighted directional graph comprising a number of nodes and a number of edges. The perspective relations graph data object 500 may represent data for at least a portion of the perspectives data object set 306. In this regard, the perspective relations graph data object 500 may include a node for each data feature represented in at least one of the perspective data objects of the perspectives data object set, and an edge data object representing a determined relation between two data features. In this regard, a weight associated with a particular edge represents the correlation of the relation between the two data features represented by the nodes connected by the edge.

As illustrated, where $P_i$ represents a first feature of one or more perspectives of the perspective feature set and $P_n$ represents a second feature of one or more perspectives of the perspective feature set, WE represents a weight for an edge between $P_i$ and $P_n$. For example, in at least one embodiment, WE between a first node $P_i$ and a second node $P_n$ is determined based at least in part on a determined probability, such as determined based at least in part on a function PerspectiveProbability($P_i|P_n$). In this regard, edges may be generated for a subset of data features for one or more generated perspective data objects. Upon generating nodes and edges of the perspective relations graph data object 500, the perspective relations graph data object 500 may be sorted, for example by sorting the edges by decreasing order of the various weights. In this regard, one or more central data features may be identified based at least in part on the most heavily weighted nodes (e.g., vertices representing the most heavily weighted data features).

The depicted perspective relations graph data object 500, for example, includes nodes associated with various weights as depicted by the color of each node, where darker coloring represents a heavier weight, and corresponding edges between the various nodes. Specifically, the perspective relations graph data object 500 includes various nodes, comprising at least nodes 502A, 502B, and 502C (collectively "nodes 502") in this regard, and various associated edges, for example edge 504, between the depicted nodes. In some such embodiments, the edges between the various nodes are weighted upon various iterations of data feature determinations for various data records of a processable data set. In this regard, as the edge weights are updated for each data record of the processable data set, the heavily weighted nodes may embody central nodes with high probabilistic relations to another feature. As illustrated, the nodes 502 are heavily weighted, representing central nodes between various other nodes. Each of such nodes 502 may represent features associated with high-level perspectives (e.g., where multiple features are related to the perspectives). Similarly, the outer nodes therefrom may represent features associated with lower-level, or more granular, perspectives associated with the data being processed. In this regard, in at least one example context, the perspective relations graph data object 500 represents the underlying relationship between prominent characteristics for various perspective data object(s).

In some embodiments, a perspective relations graph data object may be further processed to generate a corresponding hierarchical perspectives data object for the various generated perspective data objects. In this regard, the total edge weight for a node may be utilized to organize the various nodes for generating a corresponding hierarchical perspective data object for the various perspective data objects. For example, the depicted perspective relations graph data object 500 may be processed to generate a hierarchical perspectives data object for the various perspective data objects of the generated perspectives data object set 306. In some embodiments the hierarchical perspectives data object embodies and/or otherwise represents a relationship between the level of granularity associated with each perspective data object. For example, in some such embodiments where the hierarchical perspectives data object comprises a tree data structure, higher-level perspective data objects (e.g., those closer to the root note of the tree) represent higher-level characteristics for processing the processable data object set.

Specifically, FIG. 6 illustrates a hierarchical perspectives data object 602 comprising a plurality of perspective data objects. It should be appreciated that the hierarchical perspectives data object 602 may be generated by processing a perspective relations graph data object, such as the perspective relations graph data object 500 and/or a complete graph associated therewith, utilizing one or more algorithms. For example, in some embodiments, a perspective relations graph data object is processed using an algorithm associated with a data structure type for the hierarchical perspectives data object to be generated. The hierarchical perspectives data object may be generated as any of a number of different tree data structures, for example and without limitation a binary tree, balanced binary tree, or other n-leaf tree. In some such embodiments, a tree generation algorithm corresponding to the desired tree data structure type is utilized to generate the hierarchical perspectives data object from the corresponding perspective relations graph data object.

One example tree generation algorithm determines a hierarchy based on at least the node distribution between connected nodes. Consider, for example, a first node A may be associated with X connected nodes, while a second node B may be associated with Y connected nodes, with the first node A sharing Z nodes with the second node B. For illustrative purposes, consider X is 20, Y is 4, and Z is 3. One example tree generation algorithm is configured to determine whether the difference in the ratios of shared nodes compared to all connected nodes for the first node A and second node B satisfies a difference threshold. For example, continuing the illustrative example, first node A has a ratio of 3:20 shared nodes with second node B to connected nodes (15% shared nodes), while second node B has a ratio of 3:4 shared nodes with first node A to connected nodes (75% shared nodes), resulting in a 0.6 difference between the ratios. The algorithm may determine that the difference satisfies a determined and/or predetermined difference threshold (e.g., exceeds the difference threshold), and thus determine that second node B is a child node of first node A. It should be appreciated that a similar algorithm may be repeated for any number of node pairings.

In some embodiments, a hierarchical perspectives data object includes a plurality of perspective data objects representing nodes having a parent-child relationship with a second node. In this regard, the various perspective data objects of the hierarchical perspectives data object form multiple perspective detail levels, such that a parent node representing a first perspective data object is embodied by data features of less granularity as compared to those of a child node representing a second perspective data object. Specifically, as illustrated, the hierarchical perspectives data object 602 represents a set of perspective detail levels, specifically a first perspective detail level 604, a second perspective detail level 606, and a third perspective detail level 608. Each of the perspective detail levels 604-608 include a perspective subset comprising at least one perspective data object associated with the perspective detail level. In some embodiments, each perspective detail level is represented by and/or associated with a numerical and/or categorical representation, for example that represents the distance between the data object and the root of the hierarchical perspectives data object. For example, as illustrated with respect to hierarchical perspectives data object 602, the first perspective detail level 604 may be associated with level "1," the second perspective detail level 606 may be associated with "2," and the third perspective detail level 608 may be associated with "3." In some such embodiments, each of the perspective data objects may be associated with the representation for the perspective detail level at which the perspective data object is located.

In this regard, the perspective data objects at each of the perspective detail level represents a more granular combination of data features than a child perspective data object at a lower perspective detail level. For example, in some embodiments as illustrated, the first perspective detail level 604 includes a subset of perspective data objects comprising perspective data objects 604A and 604B. Similarly, the second perspective detail level 606 includes a subset of perspective data objects comprising perspective data objects 606A, 606B, and 606C. As illustrated, each of the perspective data objects 606A, 606B, and 606C represents a child perspective data object from perspective data object 604B, such that each of the perspective data objects 606A, 606B, and 606C represents a more granular combination of data features as compared to the combination of data features associated with perspective data object 604B. Further, as illustrated, the third perspective detail level 608 includes a subset of perspective data objects comprising perspective data objects 608A and 608B. As illustrated, each of the perspective data objects 608A and 608B represents a child perspective data object from perspective data object 606A, such that each of the perspective data objects 608A and 608B represents a more granular combination of data features as compared to the combination of data features associated with perspective data object 606A.

In one example context, each perspective data object represents a perspective for processing a processable data set comprising a plurality of claim data records, such that the perspective data objects at each perspective detail level are associated with different granularities of claim data record processing. For example, in one example context, the perspective data objects 604A and 604B at the first perspective detail level 604 may each represent features associated with two different types of heart surgery. Further in this example context, the perspective data objects 606A, 606B, and 606C at the second perspective detail level 606 may each represent features associated with three different medical billing codes for the type of heart surgery characterized by perspective data object 604B. Further in this example context, the perspective data objects 608A, 608B, and 608C at the third perspective detail level 608 may each represent features associated with two different providers associated with the medical billing code characterized by the perspective data object 606A. It should be appreciated that, as described above, the specific characterizations of the perspective data objects, and the parent-child relationship characterized thereby between the perspective data objects may be generated based at least in part on the algorithms, models, and/or the like, utilized to generate the perspective data objects and associated perspective relations graph data object. Accordingly, it should be appreciated that in other contexts, the perspective data objects may represent a combination of procedure types, providers, billing codes, treatment methods, and/or a combination of other data feature values.

In some embodiments, the hierarchical perspectives data object 602 is rendered to one or more interfaces, for example to a client device associated with one or more users. In some such embodiments, the hierarchical perspectives data object 602 is rendered to the one or more interfaces utilizing one or more interface elements configured to receive user interaction by the one or more users. In some such embodiments, for example, each of the perspective data objects is configured to receive user interaction. In some such embodiments, user interaction with a perspective data object causes rendering of one or more child perspective data objects associated with a lower perspective detail level, if at least one exists. In this regard, a user may interact with the various perspective data objects to traverse the hierarchical perspectives data object 602 without visual clutter associated with all other perspective data objects for paths of the hierarchical perspectives data object 602 that the user is not interested in exploring.

Additionally or alternatively, in some embodiments for example as illustrated, each of the perspective detail levels 604, 606, and/or 608 are rendered associated with one or more interface elements depicting the associated subset of perspective data objects. In some such embodiments, each perspective detail level is associated with at least one interface element configured for user interaction. In some such embodiments, the user may interact with such interface elements to select a perspective detail level. In this regard, the user interaction may represent selected perspective detail level associated with a selected perspective subset of the perspectives set, for example comprising one or more perspective data objects. The selected perspective detail level may represent a user desire to process a processable data set based at least in part on the level of granularity associated with the selected perspective detail level, for example based at least in part on the data features for each of the perspective data objects in the selected perspectives subset. In this regard, respective features of an input set of claim data objects may be utilized to generate the perspective data object(s) based on a perspective detail level representing a particular level of granularity. In an example context of healthcare data claims, for example, a high level perspectives represent different kinds of surgeries, such as heart surgery and knee surgery, whereas more detailed perspectives represent more granular features for each high level perspective, such as various CPT codes for heart surgery procedures and various CPT codes for knee surgery procedures.

The selected perspective subset of the perspectives set may be utilized for processing the processable data set. For example, upon user interaction indicating selection of a detail perspective level, and/or submission of a selected detail perspective level, the selected perspective subset of the perspectives set may be utilized to generate one or more anomaly scores for the processable data set, such that each generated anomaly score is associated with a perspective data object of the selected perspective subset of the perspectives set. In this regard, each perspective data object may be associated with an anomaly score set for the processable data set. Each anomaly score may be generated by an anomaly detection model trained and/or otherwise configured to generate an anomaly score for the processable data set based at least in part on the data features represented by each perspective data object. In this regard, the anomaly scores may be further processed, stored, and/or utilized for one or more actions associated with user processing and/or analysis. For example, in some embodiments the anomaly score set(s) is/are utilized for rendering one or more interfaces for access by one or more users, for example to cause rendering of such interface(s) to a client device accessible by a user. In at least one example embodiment, the anomaly score set is utilized to generate and/or cause rendering of a perspectives analysis interface comprising one or more interface elements representing and/or comprising the anomaly score set and/or associated data derived therefrom. Additionally or alternatively, the hierarchical perspectives data object may be rendered to enable a user to adjust the selected perspective detail level, if desired for example in response to user interaction, to enable processing the processable data object set according to a different level of granularity.

FIG. 7 illustrates an example depth selection interface element in accordance with at least one example embodiment of the present disclosure. In this regard, the depth selection interface element may be configured to enable a user to input a depth level selection. The depth level selection may represent a desired level of granularity for which to generate one or more perspective data objects. In this regard, it should be appreciated that each depth level selection may correspond to a number of perspective data objects to be generated.

Specifically, FIG. 7 depicts an example depth selection interface element 700. As illustrated, the depth selection interface element 700 comprises a slider interface element configured to receive user interaction for setting a depth level selection. In this regard, the depth selection interface element 700 includes a slider element 708. In some embodiments, the slider element 708 is configured to receive user interaction for positioning the slider element 708 within the depth selection interface element 700. For example, the position of the slider element 708 within the selection interface element may define the depth level selection input by the user. In one such example context, as the slider element 708 is positioned towards the left of the depth selection interface element 700, the depth level selection represents a lower number of perspective data objects (e.g., associated with a lower level of granularity). Similarly, continuing the example context, as the slider element 708 is positioned towards the right of the depth selection interface element 700, the depth level selection represents a higher number of perspective data objects (e.g., associated with a higher level of granularity). As such, the user may interact with the slider element 708 to indicate their desired level of granularity and/or otherwise cause generation of a desired number of perspective data objects.

As illustrated, the depth selection interface element 700 includes a minimum depth indicator 702. In some such embodiments, the minimum depth indicator 702 represents a minimum position for the slider element 708. Additionally or alternatively, in some such embodiments, the minimum depth indicator 702 represents a particular minimum number of perspective data objects to be generated, such that the minimum number of perspective data objects is generated in a circumstance where the slider element 708 is positioned at the minimum depth indicator 702. In yet other embodiments, the minimum position for the slider element 708 comprises a left edge of the depth selection interface element 700, such that the slider element 708 is bounded by the width of the depth selection interface element 700.

Further, as illustrated, the depth selection interface element 700 includes a maximum depth indicator 706. In some such embodiments, the maximum depth indicator 706 represents a maximum position for the slider element 708. Additionally or alternatively, in some such embodiments, the maximum depth indicator 706 represents a particular maximum number of perspective data objects to be generated, such that the maximum number of perspective data objects is generated in a circumstance where the slider element 708 is positioned at the maximum depth indicator 706. In yet other embodiments, the maximum position for the slider element 708 comprises a right edge of the depth selection interface element 700, such that the slider element 708 is bounded by the width of the depth selection interface element 700. In some embodiments, one or more of the minimum depth indicator 702 is associated with a predetermined minimum number of perspective data objects, and/or maximum depth indicator 706 is associated with a predetermined maximum number of perspective data objects.

Additionally or alternatively, in some embodiments, the minimum depth indicator 702 is associated with a determined minimum number of perspective data objects, and/or the maximum depth indicator 706 is associated with a determined maximum number of perspective data objects, for example based at least in part on one or more properties associated with the processable data set (for example, a data record count), available processing resources, and/or the like.

Further as illustrated, the depth selection interface element 700 includes a recommended optimal depth level indicator 704. In some such embodiments, the recommended optimal depth level indicator 704 is associated with a recommended optimal depth level determined and/or otherwise generated for a particular processable data object set. In this regard, the recommended optimal depth level may be a system generated number of perspectives determined and/or estimated as optimal for processing the processable data set. In some embodiments, the recommended optimal depth level is generated by processing the processable data set, and/or generated based at least in part on the data feature set for the processable data set. For example, the recommended optimal depth level may represent a particular number of perspectives associated with a predetermined optimal distribution of data features. In this regard, the recommended optimal depth level may correspond to a determined optimal granularity level for an input data set. In this regard, the recommended optimal depth level may be determined based on the number of input data objects (for example, claim data objects), the number of features per input data object, the feature distribution and number of unique occurrences for one or more features, one or more feature ranges (e.g., payment ranges for medical billing claims), and/or the like. Using the slider element 708, the user may nonetheless set a different depth level selection. In a circumstance where an input data set includes relatively few data records (e.g., only 200 claim data objects) as compared to the depth level selection (e.g., 20 perspective data objects), the generated perspective data objects may include substantial overlap for the features embodied therein. In this regard, generating less perspectives (e.g., by changing the depth level selection) or increasing the size of the input data set (e.g., to 20,000 claim data objects, or more, for example) may reduce the overlap between the generated perspective data objects, such that 20 perspective data objects may represent the recommended optimal depth level based on the overlap between the various features. It should be appreciated that the recommended optimal depth level may be generated using any algorithm desired by a user, and in some embodiments is configurable to be set by the user.

In some embodiments, the recommended optimal depth level indicator 704 provides a default slider position for the slider element 708. In this regard, the user may submit a depth level selection representing the recommended optimal depth level associated with the recommended optimal depth level indicator. As such, the recommended optimal depth level may be provided as a default depth level selection in a circumstance where the user opts not to interact with the slider element 708.

FIG. 8 illustrates an example visualization of various perspective data objects within an example feature space, in accordance with example embodiments of the present disclosure. In this regard, each feature may be mapped within the illustrated feature space. As illustrated, for example, FIG. 8 includes a first perspective data object 802, a second perspective data object 804, and a third perspective data object 806. Each of the perspective data objects 802, 804, and 806 are illustrated with respect to various data features, specifically in the context of healthcare claim data record processing. In this regard, the illustrated feature space includes various data features, comprising healthcare claim revenue codes, healthcare claim geolocations, healthcare claim payment values, healthcare claim member features, healthcare claim diagnosis codes, and healthcare claim medical codes. Each of these data features as associated with various values, the various data feature values clustered at various locations within the feature space.

Each of the perspective data objects 802, 804, and 806 provides a directional perspective with respect to the depicted feature space. In this regard, the perspective data objects 802, 804, and 806 depicts how the perspective data objects cover the various feature values. As such, the various perspective data objects 802, 804, and 806, may each provide different data features for use in generating anomaly scores via one or more configured anomaly detection model(s). In some embodiments, for example, the data features encompassed by the one or more perspective data objects 802, 804, and/or 806 are used to configure one or more anomaly detection models, and/or generate one or more anomaly scores corresponding to the perspective data object. Accordingly, a user may generate such anomaly scores for each of the perspective data objects 802, 804, and 808 to analyze a processable data set based at least in part on various ideas without requiring manual reconfiguring of one or more models for performing such analysis consistent with the desired idea(s). Additionally or alternatively, such ideas may be explored at varying levels of granularity without additional manual reconfiguration of the various models.

FIG. 9 illustrates an example visualization of the effectiveness of each perspective data object for various desired objectives with respect to processing a processable data object set based on a plurality of anomaly detection models. In this regard, the visualization depicted in FIG. 9 provides an interface for comparing the performance of such anomaly detection models for one or more perspective data objects. Specifically, FIG. 9 depicts an example graphical visualization 900 comprising representations of the effectiveness of perspectives data objects 802, 804, and 806 with respect to various objectives for healthcare claim data record processing based on an anomaly detection model configured for each objective (e.g., a waste detection model, an error detection model, a fraud detection model, and the like). In this regard, the graphical visualization 900 includes graphical element 902 associated with perspective data object 802, graphical element 904 associated with perspective data object 804, and graphical element 906 associated with perspective data object 806. Further, the graphical visualization 900 may be associated with various healthcare data record processing objectives, for example classification of one or more claim data records, providers, and/or other healthcare administration entities as associated with normal healthcare claim processing behavior, fraudulent claim processing behavior, wasteful claim processing behavior, abusive claim processing behavior, and erroneous claim processing behavior.

In this regard, as illustrated, the various perspective data objects are effective differently for each of types of classification. For example, as depicted by the graphical element 902, the first perspective data object 802 is effective at classifying with respect to fraudulent claim processing behavior, wasteful claim processing behavior, and abusive claim processing behavior. with normal and erroneous claim processing behavior being significantly less effectively classified based at least in part on the various data features of the associated perspective. Further, as depicted by the graphical element 904, the second perspective data object 804 is effective at classifying with respect to fraudulent claim processing behavior and waste claim processing behavior, however less so than the first perspective data object 802, and effective at classifying normal claim processing behavior. Further still, as depicted by the graphical element 906, the third perspective data object 806 is effective at classifying with respect to normal claim processing behavior and erroneous claim processing behavior, more than any other perspective data object, but less effective at classification of abusive, wasteful, and fraudulent claim processing behavior. In this regard, the various perspectives may be utilized to effectively explore various ideas associated with processing a processable data set, for example a set of healthcare claim data records.

FIGS. 10A and 10B illustrate example user interface elements rendered based at least in part on processing of a processable data object set, in accordance with at least one example embodiment of the present disclosure. It should be appreciated that these, and other interfaces illustrated herein, are merely exemplary, and in other embodiments the generated data, and/or data derived therefrom, may be illustrated in any of a myriad of interfaces comprising any of a myriad of interface components. Specifically, for example, FIG. 10A depicts an example perspectives analysis interface 1002 comprising various renderings associated with the generated anomaly score set for each perspective data object of a selected perspective subset of a perspectives set. In this regard, the perspectives analysis interface 1002 includes a plurality of such interface elements, each rendered with a group description and providing one or more sub-interface elements associated with the various anomaly scores.

FIG. 10B illustrates one example interface element associated with a perspective data object, in accordance with at least one example embodiment of the present disclosure. Specifically, FIG. 10B depicts interface element 1050 and the various sub-interfaces of the example interface element 1050. As illustrated, the interface element includes a group details element 1052. In the context of healthcare claim data processing, the group details element 1052 includes various information associated with the group for one or more processed claim data records. For example, in some embodiments, the group details element 1052 includes rendered versions of features embodying prominent characteristics for a group of providers in the healthcare claims processing context. For example, as illustrated, the group of providers are associated with a shared location, two CPT codes (e.g., highest frequency CPT codes), and highest frequency modifiers.

Additionally or alternatively, in some embodiments, the interface element 1050 includes the provider indicators 1054. In some embodiments, each of the provider, for example a healthcare services provider associated with at least one claim data record, is associated with an interface element of the provider indicators 1054. In some such embodiments, one or more properties for one of the provider indicators 1054 defines one or more determinations associated with the associated provider. For example, in some embodiments, the size of a provider indicator of the provider indicators 1054 represents the amount paid based at least in part on the claim data records associated with the provider. Additionally or alternatively, in some embodiments, the vertical position of the provider indicator of the provider indicators 1054 represents a level of associated behavior change for the corresponding provider. In this regard, the distance between providers in each group shows the integrity of the provider (e.g., based on consistency of billings for processable data objects, such as claim data objects, associated with the provider) with respect to the other providers in the peer group. In other embodiments, a subset of providers is associated with a single provider indicator of the provider indicators 1054.

Additionally or alternatively still, in some embodiments, the interface element 1050 includes the provider deviation element 1056. In this regard, the provider deviation element 1056 provides a depiction of the difference between various providers indicated by the provider indicators 1054. For example, in some embodiments, the provider deviation element 1056 depicts the standard deviation, and/or variance, associated with the amount paid by the providers as indicated by the provider indicators 1054. In this regard, in at least some embodiments, the provider deviation element 1056 is positioned such that it encompasses a desired percentage of the provider indicators 1054 from a desired middle indicator of the provider indicators 1054, for example a provider indicator associated with the mean or median provider indicator. It should be appreciated that, in other embodiments, the provider deviation element 1056 defines a value for a standard deviation between any other feature associated with processable data objects for various providers.

FIG. 11 illustrates an example provider analysis interface, in accordance with at least one example embodiment of the present disclosure. As illustrated, the provider analysis interface includes one or more sub-interfaces for analyzing one or more determined and/or identified information associated with one or more providers associated with a processable data set. For example, in at least one example context, the provider analysis interface 1100 is provided for analyzing various data associated with providers for various healthcare claim data records of a processable data set. As illustrated, the provider analysis interface 1100 includes the perspectives analysis interface 1002 as described herein. In this regard, the provider analysis interface 1100 may include any number of sub-interfaces derived from and/or based at least in part on the anomaly score set(s) and/or other information derived during processing of the processable data set. Additionally or alternatively, the provider analysis interface 1100 includes one or more other interfaces and/or sub-interface elements, comprising summary information regarding the number of providers, total claim amount paid, total number of claims, total number of members, and/or the like. Additionally or alternatively, in some embodiments, the provider analysis interface 1100 includes various interfaces depicting visualizations for comparison between peer providers.

In some embodiments, one or more additional interfaces and/or sub-interfaces are provided associated with other entities for healthcare claim data record processing. For example, FIG. 12 illustrates an example claim analysis interface, in accordance with at least one example embodiment of the present disclosure. Specifically, as illustrated, the claim analysis interface includes one or more sub-interfaces for analyzing various claim data records associated with one or more other entities, such as providers. In some such embodiments, the claim analysis interface is rendered together with and/or additional to a provider analysis interface, for example the provider analysis interface 1100 as described above.

FIG. 12 depicts an example claim analysis interface 1200. In this regard, the claim analysis interface 1200 includes one or more interface elements for selecting one or more provider identifiers associated with one or more data records of a processable data set. For example, as illustrated, the claim analysis interface 1200 includes at least one interface element for selecting a provider identifier for viewing additional information and/or derived data for the selected provider identifier. In some embodiments, the interface element for selecting a provider identifier includes only a limited number of provider identifiers, for example only a predetermined number of top providers associated with one or more data values, such as the highest claim payout amounts. In other embodiments, the interface element for selecting a provider identifier includes all provider identifiers associated with at least one data record of the processable data set.

In some embodiments, upon selecting a provider identifier, one or more additional interface elements provides additional information associated with the selected provider identifier. For example, in some embodiments, the claims analysis interface 1200 includes one or more sub-interfaces configured to provide claim data record level information for claim data records associated with the selected provider identifier. For example, in some embodiments, the claim analysis interface 1200 includes at least an individual claims score interface element and/or average claim score over time interface element associated with at least one claim associated with the selected provider identifier. Additionally or alternatively, as depicted, in some embodiments the claim analysis interface includes one or more details associated with the claim data records associated with the selected provider identifier. For example, in this regard, some or all of the data values associated with each claim data record associated with the selected provider identifier is rendered within one or more interface elements. In some such embodiments, for example, a claim records table is provided comprising all data values for the various claim data records of a processable data set that are associated with the selected provider identifier. Such interface elements may update to reflect a different subset of claim data records when a new selected provider identifier is selected.

Example Process Flowcharts and Operations

Having described example systems, apparatuses, and computing visualizations associated with data perspective generation and visualization, example flowcharts comprising various operations performed by apparatuses, devices, and/or sub-systems of the above described systems will now be discussed. It should be appreciated that each of the flowcharts depicts an example computer-implemented process that may be performed by one, or more, of the above described apparatuses, systems, and/or devices. In regard to the below charts, one or more of the depicted blocks may be optional in some, or all, embodiments. Optional blocks are depicted with broken ("dashed") lines.

It should be appreciated that the particular operations depicted and described below with respect to FIGS. 13-17 illustrate specific operations or steps that may be performed in a particular process. Further, the process may be implemented by computer hardware, software, or a combination thereof, of a system, apparatus, device, or the like, as a computer-implemented method. In other embodiments, the various blocks may represent blocks capable of being performed by an apparatus, device, or system. For example, computer-coded instructions may be specially programmed for performing the various operations depicted and stored for execution by one or more processors. In other embodiments, computer program code capable of executing the operations depicted by the various blocks may be stored to one or more non-transitory memory devices associated with a computer program product or other computer readable storage medium.

In some embodiments, it should be appreciated that the operations described herein are performed by a data processing system, for example embodied by the apparatus 200. In some such embodiments, the user may interact with the data processing system 102 via a specially configured client device. The client device may be configured for rendering one or more interface elements and/or receiving user input associated with rendered interface elements, and/or transmitting one or more signals to the data processing system to initiate and/or facilitate processing of a processable data set. It should be appreciated that all such embodiments are to be within the scope of the disclosure herein.

FIG. 13 illustrates an example process for data perspective generation and visualization, in accordance with at least one example embodiment of the present disclosure. The example process illustrated may be performed by a data processing system, for example a data processing system 102 embodied by the apparatus 200. In some embodiments, the apparatus 200 includes and/or is otherwise in communication with one or more apparatuses, systems, devices, and/or the like, to facilitate the operations as depicted and described herein.

At block 1302, the apparatus 200 includes means, such as the input/output module 206, communications module 208, data exploration module 212, processor 202, and/or the like, configured to identify a processable data set. In some embodiments, the processable data set includes at least one data record for processing. In some embodiments, to identify the processable data set, the apparatus 200 is configured to retrieve the processable data set from at least one datastore. In some embodiments, the apparatus 200 is configured to query one or more datastores, for example for one or more data records stored to the one or more datastores, and/or a subset of the stored processable data set based at least in part on one or more query parameters.

Additionally or alternatively, in some embodiments, the apparatus 200 is configured to receive the processable data set from a client device. In some such embodiments, the processable data set, or at least a portion thereof, is transmitted, via the client device, by the user to the apparatus 200 for processing. In this regard, the client device may be configured to enable the user to upload a processable data set for processing via the apparatus 200.

At block 1304, the apparatus 200 includes means, such as the data exploration module 212, processor 202, and/or the like, configured to generate a perspectives set based at least in part on at least a data feature set associated with the processable data set. In some embodiments, the perspectives set is generated based at least in part on at least a data feature set associated with the processable data set. For example, in some embodiments, the perspectives set includes at least one perspective data object comprising at least a subset of the data feature set. In this regard, each perspective data object may include a combination of one or more data features for the data feature set. It should be appreciated that, in at least some embodiments, the perspective set includes a particular number of perspective data objects for the processable data set. For example, in some embodiments, the number of perspective data objects generated is associated with a depth level selection, as described herein.

As described herein, in at least some embodiments, the apparatus 200 is configured to generate the perspectives data set via one or more subsets. For example, in at least one example embodiment, the apparatus 200 is configured to generate the perspective set utilizing a data perspectives generation model, as described herein. In some such embodiments, the data perspectives generation model is configured to receive the processable data set as input to the model. In this regard, the perspective data object model may be specially configured to generate the perspective set from the processable data set. In some embodiments, the data perspectives generation model comprises a self-supervised machine learning model. In this regard, the data perspectives generation model may be embodied by any of a number of self-supervised machine learning model implementation(s). In some such embodiments, the self-supervised machine learning implementation(s) are specially trained, as described herein, to generate a particular number of perspective data objects for a processable data set. In some such embodiments, the perspectives generation model may be configured to generate and/or otherwise identify a data feature set associated with the processable data set for use in generating the perspectives set.

In some other embodiments, the apparatus is configured to generate a claim feature set based at least in part on the processable data set, and subsequently identify one or more perspective data objects based at least in part on the identified claim feature set. For example, in this regard, the apparatus 200 may process the processable data set as described herein with respect to FIG. 16.

At block 1306, the apparatus 200 includes means, such as the data exploration module 212, processor 202, and/or the like, configured to generate, based at least in part on at least the perspectives set, a hierarchical perspectives data object representing a set of perspective details levels. In some such embodiments, the set of perspective detail levels are defined based at least in part on a parent-child relationship between various perspective data objects of the perspectives set. In this regard, each perspective detail level of the set of detail levels may be associated with at least one perspective data object of the perspectives set, and where a particular perspective detail level defines a particular level of granularity less than one or more perspective detail levels lower than the particular detail level (if any) and more granular than one or more perspective detail levels higher than the particular detail level (if any). In some embodiments, the hierarchical perspectives data object represents a top perspective detail level as "level 1," with each subsequent perspective detail level descending therefrom. For example, the hierarchical perspectives data object may be embodied by a tree data structure comprising various leaf nodes embodied by the perspective data objects. In some such example embodiments, the hierarchical perspectives data object is embodied by a binary tree data structure, however it should be appreciated that any of a number of tree data structures may be utilized.

In some embodiments, the apparatus 200 is configured to generate the hierarchical perspectives data object using a perspective relations graph data object. For example, in this regard, the apparatus 200 may generate the hierarchical perspectives data object as described herein with respect to FIG. 15. Additionally or alternatively, in some embodiments, the apparatus 200 is configured to perform one or more operations utilizing the hierarchical perspectives data object. For example, in some embodiments the apparatus 200 is configured to cause rendering of the hierarchical perspectives data object and/or receive subsequent user interaction, for example as described herein with respect to FIG. 17.

At block 1308, the apparatus 200 includes means, such as the input/output module 206, communications module 208, data exploration module 212, processor 202, and/or the like, configured to receive a selected perspectives level indication representing a selected perspective detail level of the set of perspective detail levels. In some such embodiments, the selected perspective detail level is associated with a selected perspective subset of the perspectives set. In this regard, for example, the selected perspectives level indication may represent a perspective detail level in the set of perspective detail levels for the hierarchical perspectives data object, such that the selected perspective subset comprises all perspective data objects at the perspective detail level represented by the selected perspectives level indication. In some embodiments, the selected perspectives level indication is received in response to user interaction with one or more rendered interfaces, for example in response to user interaction with one or more interface elements associated with a hierarchical perspectives data object, for example as described herein with respect to FIG. 17. In yet other embodiments, the selected perspectives level indication is received automatically from the apparatus 200 in response to an automatic determination, such as a default selected perspectives level indication.

At block 1310, the apparatus 200 includes means, such as the input/output module 206, communications module 208, data exploration module 212, processor 202, and/or the like, configured to generate, using an anomaly detection model set, an anomaly score set for at least one perspective data object of the selected perspective subset. In some embodiments, for example the apparatus 200 is configured to generate an anomaly score set for each perspective data object of the selected perspective subset. In this regard, the apparatus 200 may be configured to create and/or configure the anomaly detection model set for each perspective data object of the selected perspective subset. In this regard, the apparatus 200 create the anomaly detection model set as specially configured based at least in part on each of the selected perspective data objects, and utilize the created anomaly detection model set for a particular perspective data object to generate the anomaly score set for the particular perspective data object. In some embodiments, the apparatus 200 is configured to store the anomaly score set may associated with the anomaly detection model set, and/or one or more of the generated perspectives set and/or other data associated with the anomaly score set may also be stored. In this regard, the data may be stored to enable future processing, tracking, and/or other analytics with respect to the effectiveness of each of the anomaly detection models.

The anomaly score set for the selected perspective data objects may be utilized in any of a myriad of manners. For example, in some embodiments, at optional block 1312, the apparatus 200 includes means, such as the input/output module 206, communications module 208, data exploration module 212, processor 202, and/or the like, configured to cause rendering of a perspectives analysis interface. The perspectives analysis interface may include any of a number of interface elements, for example at least one interface element associated with (1) one or more of the anomaly score set for each perspective data object of the selected perspective subset, (2) the hierarchical perspectives data object, and (3) the processable data set. In this regard, the perspectives analysis interface includes at least one interface element depicting the various anomaly score set for each perspective data object of the selected perspective subset. For example, such interface elements may be utilized to compare anomaly scores for the various selected perspective data objects.

FIG. 14 illustrates additional operations for an example process for data perspective generation and visualization, in accordance with at least one example embodiment of the present disclosure. The example process illustrated may be performed by a data processing system, for example a data processing system 102 embodied by the apparatus 200. In some embodiments, the apparatus 200 includes and/or is otherwise in communication with one or more apparatuses, systems, devices, and/or the like, to facilitate the operations as depicted and described herein.

At optional block 1402, the apparatus 200 includes means, such as the data exploration module 212, processor 202, and/or the like, configured to generate a recommended optimal depth level. In some embodiments, the recommended optimal depth level represents a determined and/or predetermined number of perspective data objects to be generated for a particular processable data set. For example, in some embodiments, the apparatus 200 is configured to utilize one or more optimal depth determination algorithms to generate the recommended optimal depth level for a processable data set. For example, the optimal depth determination algorithm(s may identify feature set associated with the processable data set and/or determine a number of perspective data objects to encompass all, or a determined subset, of the data features for the identified feature set. As described herein, the recommended optimal depth level may be calculated based on any of a myriad of parameters, and using any of a myriad of algorithms. For example, in at least one example context, the recommended optimal depth level is generated based on at least a maximum depth parameter, a number of unique features determined for a processable data object set, and a total number of features for a processable data object set (e.g., where recommended optimal depth level=number of unique features*maximum depth parameter/total number of features).

At block 1404, the apparatus 200 includes means, such as the input/output module 206, communications module 208, data exploration module 212, processor 202, and/or the like, configured to cause rendering of a depth selection interface element. In some embodiments, the depth selection interface element is configured to receive user interaction for inputting a depth level selection. In one example embodiment, the depth selection interface element comprises a slider interface element. In this regard, a user may interact with the slider interface element to reposition the slider interface element within the depth selection interface element and input a corresponding depth level selection. In some embodiments, the apparatus 200 is configured to transmit one or more signals embodying the depth selection interface element, or representing data associated with the depth selection interface element, to a client device to cause the client device to render the depth selection interface element.

At block 1406, the apparatus 200 includes means, such as the input/output module 206, communications module 208, data exploration module 212, processor 202, and/or the like, configured to receive a depth level selection in response to user interaction with the depth selection interface element. In some embodiments, the depth level selection is received from a client device, for example immediately in response to the ending of a user interaction with the depth selection interface element. In some embodiments, the depth level selection is received in response to a user interaction with an additional interface element, for example a "submit" button associated with the depth selection interface element. In this regard, the received depth level selection represents, or otherwise is associated with, a particular number of perspective data objects. The received depth level selection may be utilized for one or more operations performed by the apparatus 200. For example, in some embodiments, the apparatus 200 is configured to utilize the depth level selection to generate a perspectives set having the specific number of perspective data objects represented by the depth level selection.

In some embodiments, after block 1406, flow continues to one or more operations described with respect to one of the other processes described herein. For example, in some embodiments, flow returns to block 1304 as depicted and described with respect to FIG. 13. Additionally or alternatively, in some embodiments, the flow ends after completion of block 1406.

FIG. 15 illustrates an example process for generating a hierarchical perspectives data object, in accordance with at least one example embodiment of the present disclosure. The example process illustrated may be performed by a data processing system, for example a data processing system 102 embodied by the apparatus 200. In some embodiments, the apparatus 200 includes and/or is otherwise in communication with one or more apparatuses, systems, devices, and/or the like, to facilitate the operations as depicted and described herein.

At block 1502, the apparatus 200 includes means, such as the data exploration module 212, processor 202, and/or the like, configured to generate a perspective relations graph data object based at least in part on the perspectives set. In some such embodiments, the perspectives relations graph data object represents a set of weighted relationships between perspective data objects of the perspectives set. In this regard, the perspectives relations graph data object represents weighted relations between associated data features in the various perspective data objects. In some embodiments, apparatus 200 generates the perspective relation graph data object using one or more relation graph generation algorithms. For example, the perspective relations graph data object may embody a weighted, non-directional graph representing relations between the various perspective data objects of the perspectives set.

In at least one embodiment, the perspective relations graph data object is generated based on one or more features embodying one or more prominent characteristics for all perspective data objects. In an illustrative example, the apparatus 200 may be configured to filter the prominent features and create an edge between features, with the weight of each edge increasing by a predetermined value if an edge between the features has already been generated. This edge-generation process may be repeated for any number of processable data objects, for example all claim data objects, in a processable data set. After iterating, the apparatus 200 may normalize the eights on all generated edges and remove all edges that do not satisfy an associated edge weight threshold (e.g., those below a certain threshold), for example to remove loose connections between perspectives. The apparatus 200 may subsequently search and remove small nodes that are not connected to the main graph data object. In some such embodiments, the remaining main graph data object may embody the perspectives relation graph data object.

At block 1504, the apparatus 200 includes means, such as the data exploration module 212, processor 202, and/or the like, configured to generate the hierarchical perspectives data object based at least in part on at least the perspectives relations graph data object. In some embodiments, the hierarchical perspectives data object is generated based at least in part on the various weights associated with the nodes of the perspectives relations graph data object. For example, the heavily weighted nodes may be used to generate a hierarchical perspectives data object associated with a low level of granularity (e.g., high level in the hierarchical perspectives data object). Similarly, the lightly weighted nodes may be used to generate a higher hierarchical perspectives data object associated with a high level of granularity associated with a hierarchical perspectives data object.

In some embodiments, the apparatus 200 is configured to generate the hierarchical perspectives data object using a hierarchical data object generation algorithm. For example, in some embodiments the hierarchical perspectives data object is generated using one or more tree graph generation algorithms. In one such example context, the hierarchical perspectives data object comprises a binary tree generated utilizing a binary tree generation algorithm. It should be appreciated that any of a myriad of hierarchical data structures may be utilized to embody a hierarchical perspectives data object, such that the hierarchical perspectives data object is generated having one or more perspective detail levels.

In some embodiments, after block 1504, flow continues to one or more operations described with respect to one of the other processes described herein. For example, in some embodiments, flow returns to block 1308 as depicted and described with respect to FIG. 13. Additionally or alternatively, in some embodiments, the flow ends after completion of block 1504.

FIG. 16 illustrates additional operations for an example process for generating a perspectives set based at least in part on at least a future feature set associated with the processable data set, in accordance with at least one example embodiment of the present disclosure. The example process illustrated may be performed by a data processing system, for example a data processing system 102 embodied by the apparatus 200. In some embodiments, the apparatus 200 includes and/or is otherwise in communication with one or more apparatuses, systems, devices, and/or the like, to facilitate the operations as depicted and described herein.

At block 1602, the apparatus 200 includes means, such as the data exploration module 212, processor 202, and/or the like, configured to generate the claim feature set based at least in part on at least the processable data set. In some embodiments, the apparatus 200 is configured to generate the claim feature set by processing some or all of the processable data set. In some embodiments, for example, the apparatus 200 is configured to generate the claim feature set utilizing one or more feature determination algorithms. In this regard, the apparatus 200 may be configured to determine whether one or more claim features and/or corresponding claim feature values are identifiable from the data records of the processable data set. It should be appreciated that, as described, each data feature of the feature set may represent a particular characteristic for one or more data records of the processable data set.

At block 1604, the apparatus 200 includes means, such as the data exploration module 212, processor 202, and/or the like, configured to identify at least one subset of the claim feature set. In this regard, in at least one example embodiment, each subset of the data feature set shares a prominent characteristic. In this regard, the prominent characteristic may represent a characteristics determined as important for defining the associated perspective data object. As such, in some embodiments, the apparatus 200 is configured to generate perspective data objects having data features that each share the prominent characteristic such that the perspective data object represents a high-level characterization associated with the prominent characteristic. For example, in the context of healthcare claim data records, non-limiting examples of prominent characteristics include a provider, a claim type, a procedure type, a CPT code, and/or the like.

In some embodiments, after block 1604, flow continues to one or more operations described with respect to one of the other processes described herein. For example, in some embodiments, flow returns to block 1304 as depicted and described with respect to FIG. 13. Additionally or alternatively, in some embodiments, the flow ends after completion of block 1604.

FIG. 17 illustrates an example process for receiving a selected perspectives level indication, in accordance with at least one example embodiment of the present disclosure. The example process illustrated may be performed by a data processing system, for example a data processing system 102 embodied by the apparatus 200. In some embodiments, the apparatus 200 includes and/or is otherwise in communication with one or more apparatuses, systems, devices, and/or the like, to facilitate the operations as depicted and described herein.

At block 1702, the apparatus 200 includes means, such as the data exploration module 212, processor 202, and/or the like, configured to cause rendering of the hierarchical perspectives data object configured to receive user interaction.

In some embodiments, the user interaction represents user interaction with a perspective detail level of and/or associated with the hierarchical perspectives data object. In some such embodiments, the apparatus 200 renders the hierarchical perspectives data object configured to enable user interaction with the various perspective detail levels and/or associated perspective data object, for example where a user may engage a rendered perspective data objects to select the perspective data object, and display child perspective data objects associated with the selected perspective data object.

At block 1704, the apparatus 200 includes means, such as the data exploration module 212, processor 202, and/or the like, configured to receive the selected perspectives level indication in response to user interaction with the hierarchical perspectives data object. For example, in this regard, in some embodiments the user may interact with the hierarchical perspectives data object to select a perspective detail level for use in processing the processable data set. For example, in this regard, the selected perspectives level indication represents a user-selected desired selected perspective detail level. In this regard, the selected perspectives level indication may be processed by the apparatus 200 to determine and/or otherwise identify a received selected perspective detail level, which subsequently may be used to identify an associated selected perspective subset of the perspectives set. As described herein, the selected perspective subset of the perspectives set may subsequently be utilized for generating one or more anomaly score sets, for example an anomaly score set for each selected perspective data object of the perspectives set.

In some embodiments, after block 1704, flow continues to one or more operations described with respect to one of the other processes described herein. For example, in some embodiments, flow returns to optional block 1310 as depicted and described with respect to FIG. 13. Additionally or alternatively, in some embodiments, the flow ends after completion of block 1704.

CONCLUSION

Although an example processing system has been described above, implementations of the subject matter and the functional operations described herein can be implemented in other types of digital electronic circuitry, or in computer software, firmware, or hardware, comprising the structures disclosed in this specification and their structural equivalents, or in combinations of one or more of them.

Embodiments of the subject matter and the operations described herein can be implemented in digital electronic circuitry, or in computer software, firmware, or hardware, comprising the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, comprising by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, comprising compiled or interpreted languages, declarative or procedural languages, and it can be deployed in any form, comprising as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, comprising by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, comprising acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for data perspective generation and visualization, the apparatus comprising at least one processor and at least one non-transitory memory comprising computer-coded instructions thereon, the computer coded instructions, with the at least one processor, configure the apparatus to:
   identify a processable data set comprising at least one data record;
   generate a perspective data object set based at least in part on at least a data feature set associated with the processable data set, the perspective data object set comprising a first at least one perspective data object comprising at least a subset of the data feature set;
   generate, based at least in part on the first at least one perspective data object set, a hierarchical perspectives data object arranged based at least in part on a set of perspective detail levels, each perspective detail level of the set of perspective detail levels corresponding to a different subset of the perspectives data object set based at least in part on a number of branches from a root perspective data object of the hierarchical perspectives data object;
   receive a selected perspectives level indication representing a selected perspective detail level of the set of perspective detail levels, wherein the selected perspective detail level is associated with a selected perspective subset comprising a second at least one perspective data object of the perspective data object set; and
   generate at least one predicted anomaly score utilizing at least one anomaly detection machine learning model,
   wherein the at least one anomaly detection machine learning model comprises a machine learning model corresponding to each perspective data object of the second at least one perspective data object for the selected perspective subset, and
   wherein the at least one anomaly detection machine learning model is automatically trained based at least in part on a particular subset of the data feature set represented by a particular perspective data object of the selected perspective subset.

2. The apparatus of claim 1, wherein to generate the perspective data object set based at least in part on at least the data feature set, the apparatus is configured to:

generate the perspective data object set utilizing a data perspectives generation model, the data perspectives generation model configured to receive the processable data set as input, wherein the data perspectives generation model comprises a self-supervised machine learning model.

3. The apparatus of claim 1, wherein to generate the perspective data object set based at least in part on at least the data feature set, the apparatus is configured to:

generate the data feature set based at least in part on at least the processable data set; and identify at least one subset of the data feature set, the subset of the data feature set sharing a prominent characteristic.

4. The apparatus of claim 1, wherein to identify the processable data set, the apparatus is configured to:

retrieve the processable data set from at least one datastore.

5. The apparatus of claim 1, wherein to identify the processable data set, the apparatus is configured to:

receive the processable data set from a client device.

6. The apparatus of claim 1, the apparatus further configured to:

cause rendering of a perspectives analysis interface, the perspectives analysis interface comprising at least one interface element, the at least one interface element associated with (1) one or more of the at least one predicted anomaly score for each perspective data object of the selected perspective subset, (2) the hierarchical perspectives data object, and (3) the processable data set.

7. The apparatus of claim 1, wherein the set of perspective detail levels corresponds to, for at least a first perspective data object of the perspective data object set and a second perspective data object of the perspective data object set, a parent-child relationship between the first perspective data object and the second perspective data object.

8. The apparatus of claim 1, wherein to generate, based at least in part on at least the perspective data object set, the hierarchical perspectives data object, the apparatus is configured to:

generate a perspective relations graph data object based at least in part on the perspective data object set, wherein the perspective relations graph data object represents a set of weighted relationships between perspective data objects of the perspective data object set; and generate the hierarchical perspectives data object based at least in part on at least the perspective relations graph data object.

9. The apparatus of claim 1, wherein to receive the selected perspectives level indication, the apparatus is configured to:

cause rendering of the hierarchical perspectives data object; and receive the selected perspectives level indication in response to user interaction with the hierarchical perspectives data object.

10. The apparatus of claim 1, the apparatus further configured to:

receive a depth level selection, wherein the perspective set comprises a number of perspective data objects based at least in part on the depth level selection.

11. The apparatus of claim 10, the apparatus further configured to:

cause rendering of a depth selection interface element, wherein the depth level selection is received in response to user interaction with the depth selection interface element, and wherein the depth selection interface element comprises a slider interface element.

12. The apparatus of claim 11, the apparatus further configured to:

generate a recommended optimal depth level based at least in part on the data feature set, wherein the depth selection interface element includes an indication of the recommended optimal depth level.

13. The apparatus of claim 1, the apparatus further configured to:

train each anomaly detection model of the at least one anomaly detection model based at least in part on each of the subset of the data feature set represented by the particular perspective data object of the selected perspective subset that corresponds to the anomaly detection model.

14. The apparatus of claim 1, wherein the selected perspective subset comprising a plurality of perspective data objects, each perspective data object of the plurality of perspective data objects comprising a different subset of the data feature set utilized to train a different anomaly detection machine learning model of the at least one anomaly detection machine learning model.

15. The apparatus of claim 1, the apparatus further configured for:

causing rendering of a user interface comprising at least one interface element that depicts a distance between each predicted anomaly score of the at least one predicted anomaly score.

16. The apparatus of claim 1, wherein the at least one predicted anomaly score comprises a plurality of predicted anomaly scores associated with each perspective data object of the selected perspective subset, the apparatus further configured for:

causing rendering of a user interface comprising at least one interface element associated with each predicted anomaly score of the plurality of predicted anomaly scores associated with each perspective data object of the selected perspective subset.

17. The apparatus of claim 1, wherein at least a first perspective detail level of the set of perspective detail levels corresponds to a first subset of the perspective data object set, the first subset comprising a plurality of perspective data objects.

18. A computer-implemented method for data perspective generation and visualization, the computer-implemented method comprising:

identifying a processable data set comprising at least one data record;

generating a perspective data object set based at least in part on at least a data feature set associated with the processable data set, the perspective data object set comprising at least one perspective data object comprising at least a subset of the data feature set;

generating, based at least in part on the first at least one perspective data object set, a hierarchical perspectives data object representing a set of perspective detail levels, each perspective detail level of the set of perspective detail levels associated with a different subset of the perspective data object set based at least in part on a number of branches from a root perspective data object of the hierarchical perspectives data object;

receiving a selected perspectives level indication representing a selected perspective detail level of the set of perspective detail levels, wherein the selected perspective detail level is associated with a selected perspective subset comprises a second at least one perspective data object of the perspective data object set; and generating at least one predicted anomaly score utilizing at least one anomaly detection machine learning model, wherein the at least one anomaly detection machine learning model comprises a machine learning model corresponding to each perspective data object of the second at least one perspective data object for the selected perspective subset, and wherein the at least one anomaly detection machine learning model is automatically trained based at least in part on a particular subset of the data feature set represented by a particular perspective data object of the selected perspective subset.

19. The computer-implemented method of claim 18, wherein generating the perspective data object set based at least in part on at least the data feature set comprises:

generating the data feature set based at least in part on at least the processable data set; and identifying at least one subset of the data feature set, the subset of the data feature set sharing a prominent characteristic.

20. A computer program product for data perspective generation and visualization, the computer program product comprising at least one non-transitory computer readable storage medium having computer program code stored thereon, the computer program code, in execution with at least one processor, configured for:

identifying a processable data set comprising at least one data record;

generating a perspectives data object set based at least in part on at least a data feature set associated with the processable data set, the perspective data object set comprising a first at least one perspective data object comprising at least a subset of the data feature set;

generating, based at least in part on the first at least one perspective data object set, a hierarchical perspectives data object representing a set of perspective detail levels, each perspective detail level of the set of perspective detail levels associated with a different subset of the perspective data object set based at least in part on a number of branches from a root perspective data object of the hierarchical perspectives data object;

receiving a selected perspectives level indication representing a selected perspective detail level of the set of perspective detail levels, wherein the selected perspective detail level is associated with a selected perspective subset comprising a second at least one perspective data object of the perspective data object set; and generating at least one predicted anomaly score utilizing at least one anomaly detection machine learning model, wherein the at least one anomaly detection machine learning model comprises a machine learning model corresponding to each perspective data object of the second at least one perspective data object for the selected perspective subset, and wherein the at least one anomaly detection machine learning model is automatically trained based at least in part on a particular subset of the data feature set represented by a particular perspective data object of the selected perspective subset.

* * * * *